(12) United States Patent
Miyadera et al.

(10) Patent No.: US 7,457,498 B2
(45) Date of Patent: Nov. 25, 2008

(54) OPTICAL WAVEGUIDE STRUCTURE

(75) Inventors: Nobuo Miyadera, Tsukuba (JP); Rei Yamamoto, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 11/546,253

(22) Filed: Oct. 12, 2006

(65) Prior Publication Data

US 2007/0031087 A1    Feb. 8, 2007

Related U.S. Application Data

(63) Continuation of application No. PCT/JP2005/006058, filed on Mar. 30, 2005.

(30) Foreign Application Priority Data

Apr. 12, 2004   (JP)   ............................. 2004-116462

(51) Int. Cl.
    G02B 6/26     (2006.01)
    G02B 6/125    (2006.01)
(52) U.S. Cl. .............................. 385/45; 385/30; 385/42
(58) Field of Classification Search .................... 385/45, 385/30, 42
    See application file for complete search history.

(56) References Cited

U.S. PATENT DOCUMENTS

| 5,082,341 A * | 1/1992 | Walker ......................... 385/14 |
| 5,539,847 A * | 7/1996 | Lerminiaux et al. ............ 385/45 |
| 6,970,625 B2 * | 11/2005 | Johannessen et al. ......... 385/45 |

FOREIGN PATENT DOCUMENTS

| GB | 1550655 | 8/1979 |
| JP | 51-124940 | 10/1976 |
| JP | 03-239206 | 10/1991 |
| JP | 04-289803 | 10/1992 |
| JP | 05-196826 | 8/1993 |
| JP | 09-033740 | 2/1997 |
| JP | 09-178964 | 7/1997 |
| JP | 09-230151 | 9/1997 |
| JP | 3030108 | 2/2000 |
| JP | 2002-530690 | 9/2002 |
| WO | WO 00/29882 | 5/2000 |

OTHER PUBLICATIONS

Chinese Official Action dated Sep. 21, 2007 for No. 2005800109107.

* cited by examiner

*Primary Examiner*—M. R. Connelly-Cushwa
*Assistant Examiner*—Jerry T Rahll
(74) *Attorney, Agent, or Firm*—Antonelli, Terry, Stout & Kraus, LLP.

(57) ABSTRACT

An optical waveguide structure has a single port on one input/output side, a plurality of ports on another input/output side and an S-curve optical waveguide portion arranged on the outermost side of the waveguide structure and including a first circular arc optical waveguide portion and a second circular arc optical waveguide portion connected thereto. The waveguide portion also has a third circular arc optical waveguide portion extending from a first splitting/coupling point side in the first circular arc waveguide portion toward the plural/ports side and having a curvature inverted relative to the first circular arc optical waveguide portion. At the first splitting/coupling point, a tangential line of the first circular arc optical waveguide portion and a tangential line of the third circular arc optical waveguide portion are parallel to and spaced from each other.

20 Claims, 12 Drawing Sheets

OPTICAL WAVEGUIDE STRUCTURE

This application is a Continuation application of International (PCT) Application No. PCT/JP2005/006058, filed Mar. 30, 2005.

FIELD OF THE INVENTION

The present invention relates to an optical waveguide structure and in particular to an optical waveguide structure having a splitting/coupling element.

BACKGROUND OF THE INVENTION

In accordance with the recent prevalence of personal computers and the Internet, demands for transmitting information have rapidly increased and thus an optical waveguide is needed in which a whole length thereof is short, a transmitting speed is high and optical transmitting loss is small. The optical waveguide is used as an interconnection for transmitting light and an optical device such as an optical splitter (an splitting/coupling device) is indispensable as an essential element of the optical waveguide. It should be noted that the optical splitter (splitting/coupling device) activates as an optical coupler when a direction of transmitting light is inverted.

Conventionally, a one-to-N (1×N; N is 2-8.) split type optical splitter made of optical waveguides has been provided by arranging one-to-two (1×2) split type optical splitters in a tree form. In the following explanation, for convenience, a one-channel side of the splitter is referred to as an input port while a N-channel side thereof is referred to as output ports. However, the splitter can be used regarding either an optical splitting function or an optical coupling function.

Conventionally, in a one-to-four (1×4) or one-to-more split type optical splitter, an S-bent optical waveguide is disposed between a splitting element at a first stage from the input port and a splitting element at a second stage therefrom to connect them to each other, a direction of an input part of the S-bent waveguide and a direction of an output part thereof being parallel to each other. Similarly, in a one-to-eight (1×8) or one-to-more split type optical splitter, such an S-bent optical waveguide is disposed between a splitting element at a second stage from the input port and a splitting element at a third stage therefrom to connect them to each other.

A multiple split type optical circuit has been proposed in the prior art; which has at least two Y-type split elements disposed between an input path at a first stage and each of output paths at a final stage, and is arranged in a tree form parallel to directions of normal lines of the input path and the output paths; in which light transmitted into the input path is equally split to the output paths; and in which each of the Y-type split elements from a second stage to a final stage on the outermost side relative to a reference line, which is an extended centerline of the input path at the first stage, is outward, and obliquely arranged so that an angle θ between a centerline of each Y-type split element and the reference line increases when the split elements are viewed from the second stage to the final stage (Please see Patent Publication 1 below).

Another optical waveguide structure in the prior art has a waveguide which is split from an input part thereof in a tree form and includes a splitting curved line having a curvature radius enough to prevent transmission of light (Please see Patent Publication 2 below).

In the prior art, an optical coupler has an input port, $2^n$ output ports and a plurality of waveguides arranged in a substantially coplanar relationship; wherein the waveguides include Y-type junctions and a plurality of waveguide sections, each of the waveguide sections optically connecting an input part of a Y-type junction to one of two output parts of another Y-type junction; wherein the Y-type junctions are arranged in a tree and branch form along the waveguides; wherein a first Y-type junction ($J_{21}$) having an output path non-parallel to the output port of the optical coupler is connected to a second Y-type junction ($J_{31}$, $J_{32}$) via a curved waveguide section without singular points; and wherein an inflection point on any one of the waveguides disposed between the input port and Y-type junctions at a nth stage is located at one of the n Y-type junctions along a passage of the waveguide (Please see Patent Publication 3 below).

Another optical coupler in the prior art has one input optical waveguide and N output optical waveguides; wherein one optical incident signal from the input waveguide is split into N optical signals which are then output to the respective output waveguides; wherein m stages of Y-type junction waveguide elements are arranged by using a plurality of Y-type waveguide elements, one optical incident signal being split into two optical signals in each of the Y-type waveguide elements; wherein a plurality of curved waveguides are alternatively connected to the Y-type waveguide elements and at least one curved waveguide is connected between the Y-type waveguide element at the mth stage and the output waveguide; wherein, when a direction in which an optical signal is transmitted is considered to be a longitudinal ordinate and a contact point of the input waveguide contacting with the Y-type waveguide element at the first stage is considered to be an original point, the Y-type waveguide elements and the curved waveguide are arranged and dimensioned so that a path having the maximum length among the N paths from the original point to the output waveguides is replaced with a path having a minimum length (See Patent Publication 4).

Patent Publication 1: Japanese Patent No. 3030108
Patent Publication 2: Japanese Patent Laid-open Publication No. 51-124940
Patent Publication 3: Japanese Patent Laid-open Publication No. 5-196826
Patent Publication 4: Japanese Patent Laid-open Publication No. 2002-530690

SUMMARY OF THE INVENTION

Problem to be Solved

Generally, since a waveguide structure is manufactured by using a wafer manufacturing process similar to a semiconductor manufacturing process, an important problem to solve is how to reduce an area of the waveguide structure, namely, to downsize the waveguide structure, in order to increase the number of the waveguide structures obtainable from one wafer, and thus reduce the cost of the waveguide structure. In the above-mentioned optical splitter, since distances between the adjacent waveguides at the output port should be standardized length, for example, 250 μm or 127 μm, the waveguides are disposed at an equal pitch so that it is unavoidable that, the greater the number of output ports or channels is, the greater the width of the splitter on the output-port side is. Therefore, a problem to be solved is how to reduce a distance between an end on the input-port side and an end of the output-port side (referred to as "PLC (planar light-wave circuit) length" hereinafter) in order to downsize the waveguide structure and reduce the costs thereof.

To shorten the PLC length, it is important to determine how to shorten the length of an optical waveguide. Further, shortening the length of the waveguide is also important to solve another problem how to reduce transmitting loss at the waveguide as the amount of this loss depends on the length of the waveguide.

In the multiple split type circuit described in Patent Publication 1, output paths of the optical circuit or splitter are often disposed at an equal pitch because they are joined to and used for a standard piece such as an optical fiber array.

As can be seen from examples of Patent Publication 1, when a Y-type split element having a straight optical waveguide as a component thereof is arranged, it is necessary for straight waveguides toward the center-side output paths or ports to, in one case, come close to each other and thus intersect with each other, or to, in another case, lengthen a distance of a waveguide connecting the first split element to second split element. When the waveguides intersect each other as in the former case, such intersection may cause excess loss. Further, when a length of the waveguide connecting the first split element to the second split element is long, enough downsizing cannot be achieved. Further, in a connecting portion between a straight waveguide and a curved waveguide where curvature of the waveguide changes rapidly, excess loss is caused and thus sufficiently low loss cannot be achieved.

In the optical splitter described in Patent Publication 2, when a large scale optical splitter is made by using optical waveguides, the number of stages of split elements increases so that a dimension of the splitter become large. In other words, when an optical splitter is made by using optical waveguides having a curvature which causes radiation loss to be equal to or less than a fixed value, the number of points where a curvature of the waveguide is inverted increases and the waveguides meander to provide a multiple stage splitting structure in which a length of the waveguides increases. When the length of the waveguides is increased, not only transmitting loss increases accordingly but also a dimension of a waveguide device (splitter) become large, which makes it difficult to downsize it.

Patent Publication 3 relates to an optical coupler and describes a method of making a 1×N type splitter having inverted points only at portions between a curved line not having any inverted point and Y-type junction. In this method, since waveguides connecting Y-type junctions are generally formed of circular arcs, three waveguides corresponding to an input path and output paths are arranged at one Y-type junction so that respective waveguides have a common tangential line. In this splitter, a mode profile of light at the input path toward the Y-type junction is not symmetrical so that a light splitting ratio at each Y-type junction does not become 1:1. Thus, it is difficult to provide a function by which optical power is equally distributed to the N output ports.

In Patent Publication 4, a method of designing an optical coupler is described, in which method, firstly, a relative positional relationship between an input part and output parts of a Y-type waveguide element or splitting structure is determined, secondly, such Y-type waveguide elements and curved waveguides are connected to each other to form an optical waveguide structure for a splitter in a tree form, and, finally, lengths of the curved waveguides and positions of the curved waveguides are adjusted. In this method described in Patent Publication 4, after structures of the Y-type waveguide element and the curved waveguide are individually designed, arrangement thereof are lastly determined so that when a design of the Y-type waveguide element is not good, there is a problem that optical outputs to the N output ports are not equally distributed.

However, in Patent Publication 4, only directions of the three splitting waveguides of the Y-type waveguide element for connecting them to each other are described and there is no concrete description regarding a method of designing a Y-type waveguide element so that optical outputs to the N output waveguides or ports are equally distributed. Further, embodiments in the Patent Publication 4 describe only general symmetrical splitting structures. When a splitting structure is arranged based on the symmetrical splitting structure, a straight waveguide may be connected to a Y-type waveguide element, especially at the input waveguide, which means that a waveguide extending to the outermost output port partially includes a straight waveguide, thus causing the waveguide to become longer.

Further, when an optical waveguide structure in a tree form, especially a large-scale splitter, is designed by connecting the above-stated symmetry Y-type waveguide elements to each other, inner waveguides may become too close to or intersect with each other.

In the method described in Patent Publication 4, the Y-type waveguide elements and the curved waveguides connected thereto are defined as individual modules and when the modules are arranged, a final procedure for adjusting the waveguide structure becomes complicated and especially, when a large scale multiple splitter is designed, there is a problem that the number of design steps increases. Further, regarding the final adjustment of the waveguide structure, use of a polynominal arc waveguide derived from a polynominal equation is described in Patent Publication 4. In this method, since the number of parameters of the polynominal equation defining a curved waveguide is large, there is a problem that a procedure for determining the curved waveguide is complicated.

When a S-type curved optical waveguide is employed, it is preferable to use one having a large curvature to shorten its length, but such a large curvature is limited because when the curvature is too large, light leaks from a core of the waveguide. The critical curvature depends on refractive indexes of the core and a cladding of the waveguide, a dimension of the core, light wavelength and so on. In this connection, a high $\Delta$ optical waveguide in which a difference between a refractive index of the core and that of the cladding is large has been considered. However, in the high $\Delta$ waveguide, when a single mode optical waveguide is designed, a dimension of the core become small so there is a problem that coupling efficiency become worse at a portion coupled to a conventional optical fiber. In order to enhance the coupling efficiency, a spot-size-conversion type optical waveguide may be disposed at the portion coupled to the fiber. However, there is a problem in that a PLC length inevitably increases due to said disposal of the spot-size-conversion type waveguide itself.

Further, instead of arranging a multiple stage 1×N split type structure in which a plurality of 1×N split type elements are coupled, there is a method of arranging a single stage 1×N split type structure. According to this method, a PLC length of the single stage structure can be shorter in comparison with a multiple stage 1×2 split type structure but wavelength dependence of the former is relatively large so that it is difficult to arrange a large scale one-to-eight (1×8) or one-to-more optical splitter with low loss by employing the single stage structure.

Thus, in view of the above-stated problems, a main problem to be solved is how a distance between an input port and an output port can be shortened by using a curvature equal to or less than the maximum curvature to arrange an optical waveguide for a m stage 1×N split type optical splitter.

A problem to be solved in the present invention is how to downsize a substrate of the multiple splitting structure by using a novel splitting waveguide element, shortening a distance from an input end to an output end of the splitting structure without increasing a difference of loss between waveguides of the splitting structure due to a simple structure and procedures for designing of the splitting structure. Such a novel splitting waveguide element has been developed by the inventor to solve an essential part of the above-stated problems in the prior art.

Further, it is an object of the present invention to provide an optical waveguide structure which can reduce loss having splitting optical waveguide elements at a predetermined splitting ratio.

Further, it is another object of the present invention to provide an optical waveguide structure in which the degree of freedom regarding design of a splitting ratio is relatively large.

SUMMARY OF THE INVENTION

An optical waveguide structure according to the first aspect of the present invention is an optical waveguide structure having a single port on one input/output side and a plurality of ports on the other input/output side comprising an S-bent optical waveguide portion arranged on the outermost side of the waveguide structure; tangential lines at opposed ends of the S-bent waveguide portion being parallel to each other; the S-bent optical waveguide portion including a first circular arc optical waveguide portion and a second circular arc optical waveguide portion connected thereto at a first inflection point where a curvature of the S-bent optical waveguide portion is inverted; the first circular arc optical waveguide portion having a first splitting/coupling element located on a single-port side relative to the first inflection point; and a third circular arc optical waveguide portion extending from the first splitting/coupling element toward the plural-ports side and having a curvature inverted relative to the first circular arc optical waveguide portion; wherein, at the first splitting/coupling element, a tangential line of the first circular arc optical waveguide portion and a tangential line of the third circular arc optical waveguide portion are parallel to and spaced from each other.

Embodiments of the present invention are as follows.

In the optical waveguide structure, the third circular arc optical waveguide portion has a second splitting/coupling element; said optical waveguide portion further comprising a fourth circular arc optical waveguide portion extending from the second splitting/coupling element toward the plural-ports side and having a curvature inverted relative to the third circular arc optical waveguide portion; wherein, at the second splitting/coupling element, a tangential line of the third circular arc optical waveguide portion and a tangential line of the fourth circular arc optical waveguide portion are parallel to and spaced from each other.

In the optical waveguide structure, the fourth circular arc optical waveguide portion has a third splitting/coupling element; said optical waveguide portion further comprising a fifth circular arc optical waveguide portion extending from the third splitting/coupling element toward the plural-ports side and having a curvature inverted relative to the fourth circular arc optical waveguide portion; wherein, at the third splitting/coupling element, a tangential line of the third circular arc optical waveguide portion and a tangential line of the fifth circular arc optical waveguide portion are parallel to and spaced from each other.

An optical waveguide structure according to a second aspect of the present invention is an optical waveguide structure having a single port on one input/output side and a plurality of ports on the other input/output side comprising: an S-bent optical waveguide portion arranged on the outermost side of the waveguide structure; tangential lines at opposed ends of the S-bent waveguide portion being parallel to each other; the S-bent optical waveguide portion including a first circular arc optical waveguide portion and a second circular arc optical waveguide portion connected thereto at a first inflection point where a curvature of the S-bent optical waveguide portion is inverted; the first circular arc optical waveguide portion having a first splitting/coupling element located on a single-port side relative to the first inflection point; wherein the first circular arc optical waveguide portion has a first core formed on a coupling side along a first axis consisting of a line curved toward one side and a second core connected to the first core and formed on a splitting side along a second axis consisting of a line curved toward the one side; further comprising a third core connected to the first core and formed on the splitting side along a third axis consisting of a line curved toward the other side; wherein the first axis, the second axis and the third axis include respectively a first contact point, a second contact point and a third contact point where the first axis, the second axis and the third axis contact respective tangential lines parallel to each other; wherein the second contact point and the third contact point are located in a region on the splitting side relative to a reference perpendicular line extending through the first contact point and perpendicular to a reference tangential line which is the tangential line of the first axis at the first contact point; and wherein the third contact point is located on the other side relative to the reference tangential line.

In the above-mentioned optical waveguide structure for a 1×N split type splitter formed of a multiple stage of 1×2 split type splitting elements, since the outermost waveguide, namely, a waveguide extending to the outermost port (for example, 1st and 4th channel ports in case of 1×4 split type, and 1st and 8th channel ports in case of 1×8 split type) is formed of a plurality of S-type curved waveguides coupled to the splitting elements in a multiple stage manner, a PLC length becomes long. On the contrary, in the optical waveguide structure for splitters according to the present invention, when curved waveguides having the same curvature as that of the S-type curved waveguide are employed, such a PLC length can be short.

On the other hand, in a large scale optical waveguide structure for splitters and couplers in which a 1×N split type structure is arranged in a single stage splitting form by using MMI optical waveguide, slab optical waveguide and so on, since split waveguides connected to output ports are formed of S-type curved waveguides, a PLC length of the waveguide structure is determined by an S-bent waveguide connected to the outermost port. Since a starting position of the S-bent waveguide is considered to be the same as a starting position of a waveguide extending to the outermost port of the optical splitter according to the present invention, the waveguide structure for splitters according to the present invention are equal to the waveguide structure for splitters in the single stage splitting form.

Further, wavelength dependence property and difficulty of achieving equal power distribution in a large-scale waveguide structure, which are problems of the above-stated waveguide structure in the single stage splitting form, are not noticeable in the present invention.

Further, in the prior art optical waveguide structure, power distribution of light transmitted through the first circular arc waveguide portion and/or the first curved waveguide portion tends to shift at the first splitting/coupling element in a direction perpendicular to the light transmitting direction so that it is difficult to achieve a predetermined splitting ratio. On the contrary, in the present invention, the tangential line of the first circular arc waveguide portion is parallel to and spaced from the tangential line of the third circular arc waveguide portion at the first splitting/coupling element, namely, a tangential line of a first axis of the first core at the first contact point is parallel to and spaced from a tangential line of a third axis of the third core at the third contact point so that, by varying a distance between the first core and the third core according to the shift of power strength, loss can be reduced at the first splitting/coupling element having the predetermined splitting ratio. Further, by varying the above distance, a splitting ratio except for 1:1 can be achieved and thus an optical waveguide structure in which the degree of freedom regarding design of a splitting ratio is relatively high is provided.

An optical waveguide structure according to a second aspect of the present invention is an optical waveguide structure with a splitting/coupling element comprising: a first core formed on a coupling side along a first axis consisting of a line curved toward one side; a second core connected to the first core and formed on a splitting side along a second axis consisting of a line curved toward the one side; and a third core connected to the first core and formed on the splitting side along a third axis consisting of a line curved toward the other side; wherein the first axis, the second axis and the third axis include respectively a first contact point, a second contact point and a third contact point where the first axis, the second axis and the third axis contact respective tangential lines parallel to each other; wherein the second contact point and the third contact point are located in a region on the splitting side relative to a reference perpendicular line extending through the first contact point and perpendicular to a reference tangential line which is the tangential line of the first axis at the first contact point; and wherein the third contact point is located on the other side relative to the reference tangential line.

In this optical waveguide structure, strength distribution of light transmitted through the first core formed along the first axis consisting of a line curved toward the one side tends to shift toward the reference perpendicular line perpendicular to the reference tangential line which is a tangential line of the first axis and thus it is difficult to achieve a predetermined splitting ratio. On the contrary, in the present invention, since the third contact point is located on the other side relative to the reference tangential line, by varying a location of the third contact point according to the shift of the strength distribution of the light, loss at the first splitting/coupling element where light is split at a predetermined splitting ratio can be reduced. Also, by varying the location of the third contact point, a splitting ratio except for 1:1 can be defined and thus an optical waveguide structure having large degree of freedom regarding design of a splitting ratio can be provided.

Each of the lines curved toward the one side and the other side may be formed of a circular arc line, an ellipsoid arc line, a sinusoidal function line, an exponential function line and so on or a combination thereof. The curved line may be also formed of a straight line portion disposed between curved line portions.

In the above-mentioned optical waveguide structure, preferably, the second contact point is located on the one side relative to the reference tangential line.

In this optical waveguide structure, the degree of freedom regarding design of a splitting ratio can be become larger.

In the above-mentioned embodiment of the optical waveguide structure according the third aspect of the present invention, preferably, the first contact point, the second contact point and the third contact point are located on the reference perpendicular line.

In this embodiment, preferably, the second core and the third core commonly include a core portion extending from the reference perpendicular line toward the splitting side so that the second core and the third core are formed integrally.

Further, preferably, the first core includes a tapered portion, a width of which expands toward the reference perpendicular line.

Further, preferably, the first core, the second core and the third core commonly include an expanded core portion extending across the reference perpendicular line and having profiles on the one side and the other side parallel to the reference tangential line.

In the above-mentioned embodiment of the optical waveguide structure according the third aspect of the present invention, preferably, the second contact point and the third contact point are located on a second perpendicular line, which is parallel to the reference perpendicular line and placed on the coupling side relative to the reference perpendicular line; and further comprising an intermediate core between the reference perpendicular line and the second perpendicular line.

In this embodiment, preferably, profiles of the intermediate core on the one side and the other side are respective straight lines parallel to the reference tangential line, and preferably, the intermediate core defines a multimode optical waveguide.

Further, preferably, the first core has a tapered portion, a width of which expands toward the reference perpendicular line.

In the above-mentioned embodiment of the optical waveguide structure according to the fourth aspect of the present invention, an optical waveguide structure with a splitting/coupling element comprises a first core formed on a coupling side along a first axis consisting of a line curved toward one side; a second core connected to the first core and formed on a splitting side along a second axis consisting of a line curved toward the one side; a coupler core formed along a coupler axis spaced on the other side from the first core and extending alongside of the first core, the coupler core defining an optical coupler with the first core; and a third core connected to the coupler core and formed on the splitting side along a third axis consisting of a line curved toward the other side; wherein the first axis, the second axis, the third axis and the coupler axis have respectively a first contact point, a second contact point, a third contact point and a coupler contact point where the first axis, the second axis, the third axis and the coupler axis contact respective tangential lines parallel to each other; wherein the second contact point and the third contact point are located in a region on the splitting side relative to a reference perpendicular line extending through the first contact point and perpendicular to a reference tangential line which is the tangential line of the first axis at the first contact point; wherein the coupler contact point is located on the reference perpendicular line; and wherein the third contact point is located on the other side relative to the tangential line of the coupler axis which contacts it at the coupler axis contact.

In this optical waveguide structure, effects similar to those of an optical waveguide structure according to the third aspect of the present invention can be obtained.

Comparing an optical waveguide structure according to the present invention with a comparative example, a length of the former can be more significantly reduced than that of the latter. Further, insertion loss of the former is equal to or better than that of the latter.

Further, in an optical waveguide structure according to the present invention, a PLC length thereof can be shortened and an area of PLC can be reduced in the case of a multiple splitting type splitter so that the waveguide structure can be downsized and cost thereof can be reduced.

According to an optical waveguide structure of the present invention, loss at splitting optical waveguide elements having a predetermined splitting ratio can be reduced.

Further, according to an optical waveguide structure of the present invention, an optical waveguide structure in which the degree of freedom regarding design of a splitting ratio is relatively large is provided.

DETAILED DESCRIPTION OF THE PREFERRED EMBODIMENTS

A concrete exemplary way of arranging an optical waveguide for an optical splitter according to the present invention will be explained by explaining the way of arranging an optical waveguide for a 1×8 type splitter, although the scope of the present invention is not limited to such an exemplary way. Firstly, an S-bent line is arranged as a fundamental element by connecting two circular arcs having respective curvatures inverted relative to each other, namely, upward-convex and downward-convex circular arcs. The S-bent line may include, instead of or in addition to circular arc curved lines, for example, an elliptic arc curved line, sinusoidal curved line, exponential curved line and a combination of any curved and straight lines. Regarding the present invention, a type of S-bent line is not limited to circular arcs although a way of arranging an optical waveguide for an optical splitter of the present invention employing circular arcs will be explained below.

Regarding a curvature of the circular arc, the most appropriate curvature is the largest curvature allowable in view of fluctuations derived from a cross-sectional structure (for example, refractive index, dimension and shape of a core and a cladding) of an optical waveguide to be manufactured and a wavelength to be used.

First Embodiment

Figure 1:
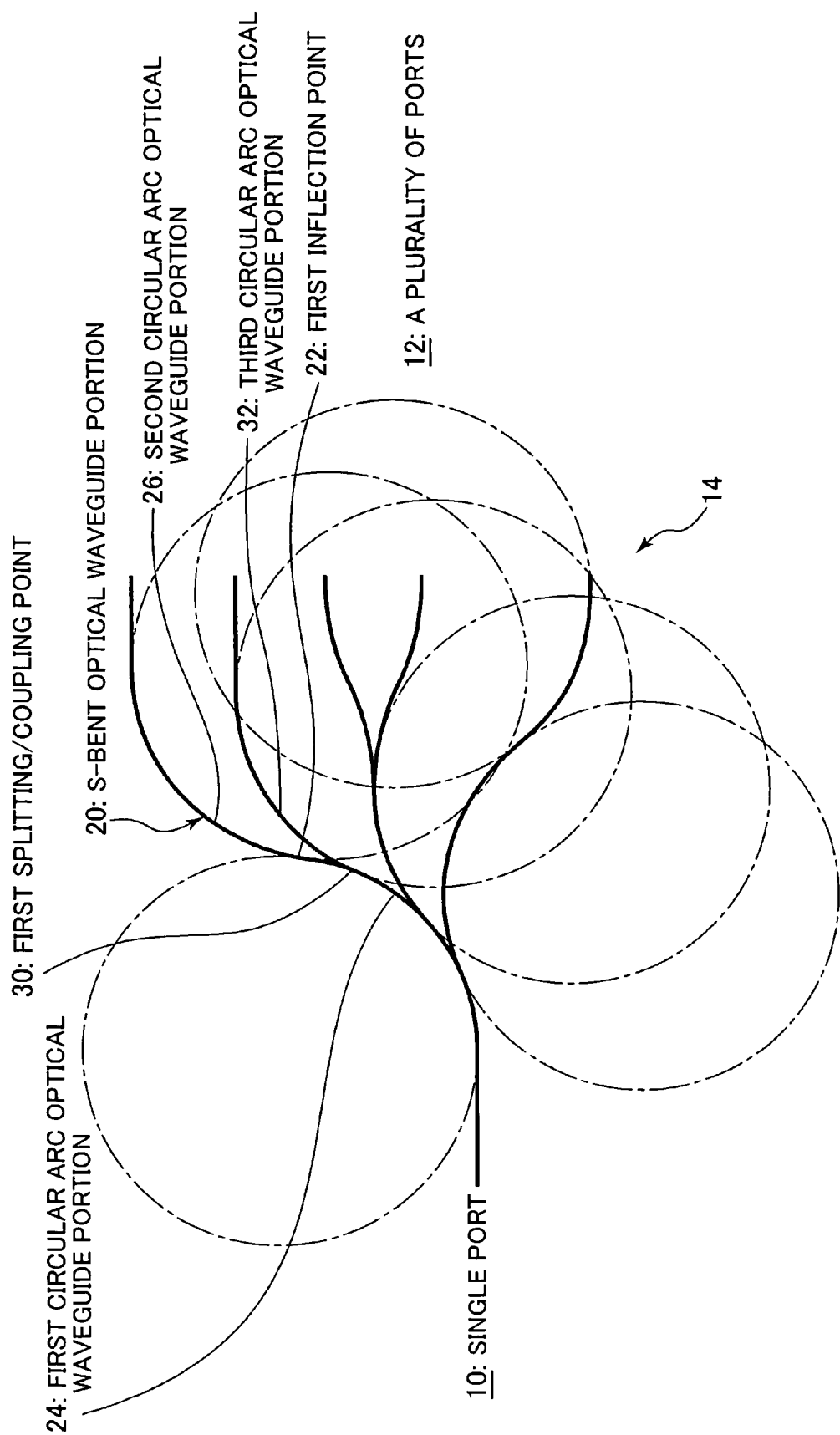
FIG. 1 is a view for explaining an optical waveguide structure of a first embodiment of the present invention.

As shown FIG. 1, an optical waveguide structure of a first embodiment of the present invention is an optical waveguide structure 14 having a single port 10 on one input/output side and a plurality of ports 12 on the other input/output side comprising an S-bent optical waveguide portion 20 arranged on the outermost side of the waveguide structure, tangential lines at opposed ends of the S-bent optical waveguide portion 20 being parallel to each other, the S-bent optical waveguide portion 20 including a first circular arc optical waveguide portion 24 and a second circular arc optical waveguide portion 26 connected thereto at a first inflection point 22 where a curvature of the S-bent optical waveguide portion 20 is inverted, the first circular arc optical waveguide portion 24 having a first splitting/coupling point 30 located on a single-port side relative to the first inflection point 22; and a third circular arc optical waveguide portion 32 extending from the first splitting/coupling point 30 toward the plural-ports side and having a curvature inverted relative to the first circular arc optical waveguide portion 24; wherein, at the first splitting/coupling point 30, a tangential line of the axis of the first circular arc optical waveguide portion 24 and a tangential line of the axis of the third circular arc optical waveguide portion 32 are parallel to and spaced from each other.

Second Embodiment

Figure 2:
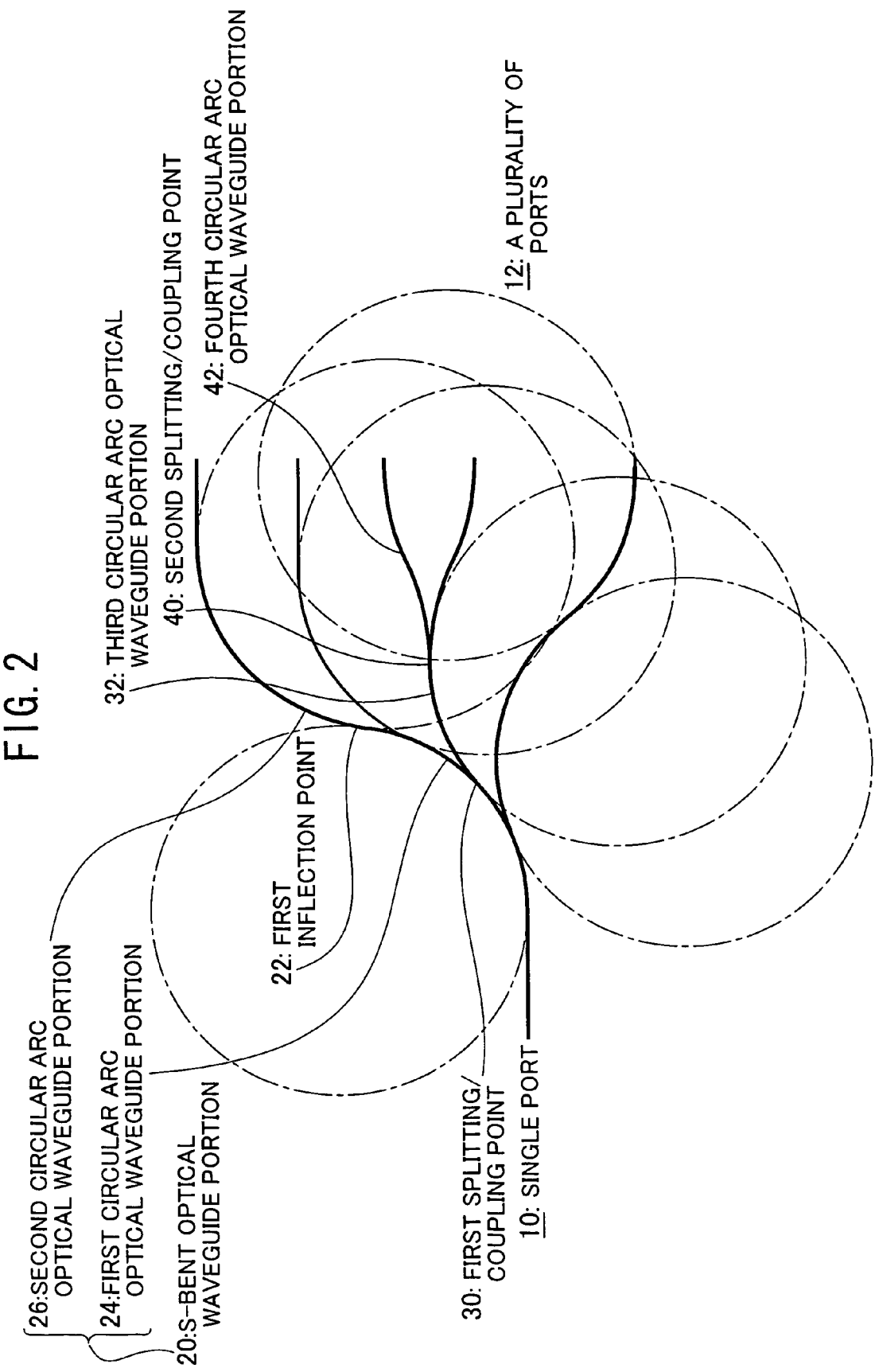
FIG. 2 is a view for explaining an optical waveguide structure of a second embodiment of the present invention.

As shown in FIG. 2, in an optical waveguide structure of a second embodiment of the present invention, the third circular arc optical waveguide portion 32 has a second splitting/coupling point 40; and the waveguide structure further comprises a fourth circular arc optical waveguide portion 42 extending from the second splitting/coupling point 40 toward the plural-ports side 12 and having a curvature inverted relative to the third circular arc optical waveguide portion 32; wherein, at the second splitting/coupling point 40, a tangential line of the third circular arc optical waveguide portion 32 and a tangential line of the fourth circular arc optical waveguide portion 42 are parallel to and spaced from each other.

Third Embodiment

Figure 3:
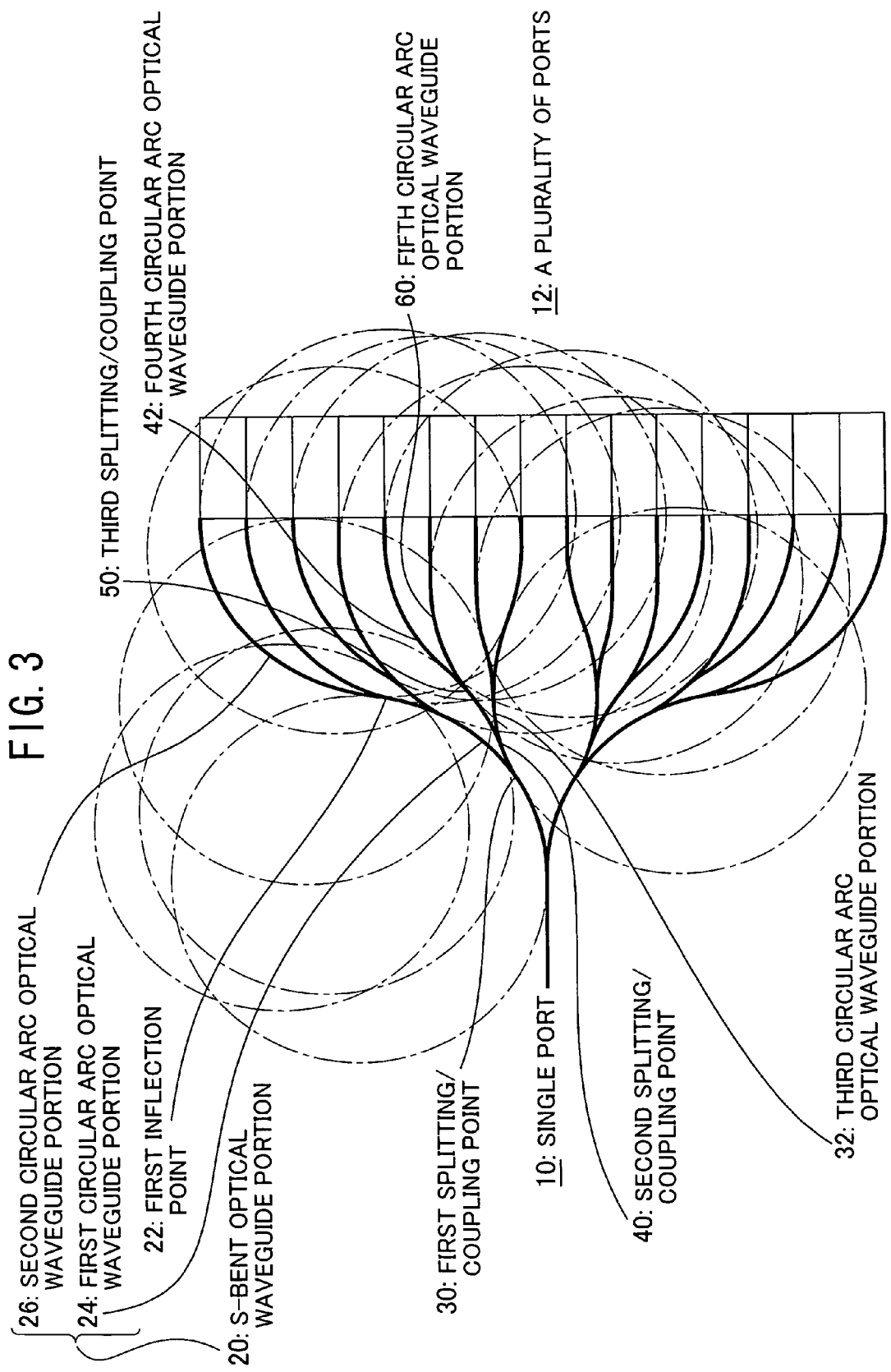
FIG. 3 is a view for explaining an optical waveguide structure of a third embodiment of the present invention.

As shown in FIG. 3, in an optical waveguide structure of a third embodiment of the present invention, the fourth circular arc optical waveguide portion 42 has a third splitting/coupling point 50; and the waveguide structure further comprises a fifth circular arc optical waveguide portion 60 extending from the third splitting/coupling point 50 toward the plural-ports side 12 and having a curvature inverted relative to the fourth circular arc optical waveguide portion 42; wherein, at the third splitting/coupling point 50, a tangential line of the fourth circular arc optical waveguide portion 42 and a tangential line of the fifth circular arc optical waveguide portion 60 are parallel to and spaced from each other.

In these embodiments, (a) V-shaped groove(s) for connecting (an) optical fiber(s) to the waveguide may be provided on at least one of the single-port side and the plural-ports side. Providing the V-shaped groove facilitates mounting of an optical fiber to the waveguide. Further, it is neither necessary to use an optical fiber block with a polished end surface nor an optical fiber array. Especially, on the plural-ports side, since it is not necessary to use the optical fiber array which is precise and expensive, a large reduction in cost is obtained. Further, regarding connection of optical fibers on the plural-ports side, since the waveguide structure and the fiber-connecting V-shaped grooves can be formed on a wafer in a single process, a very accurate alignment therebetween is obtained so that excess loss between the fibers and the waveguide at the coupling point can be reduced.

Fourth Embodiment

Figure 4:
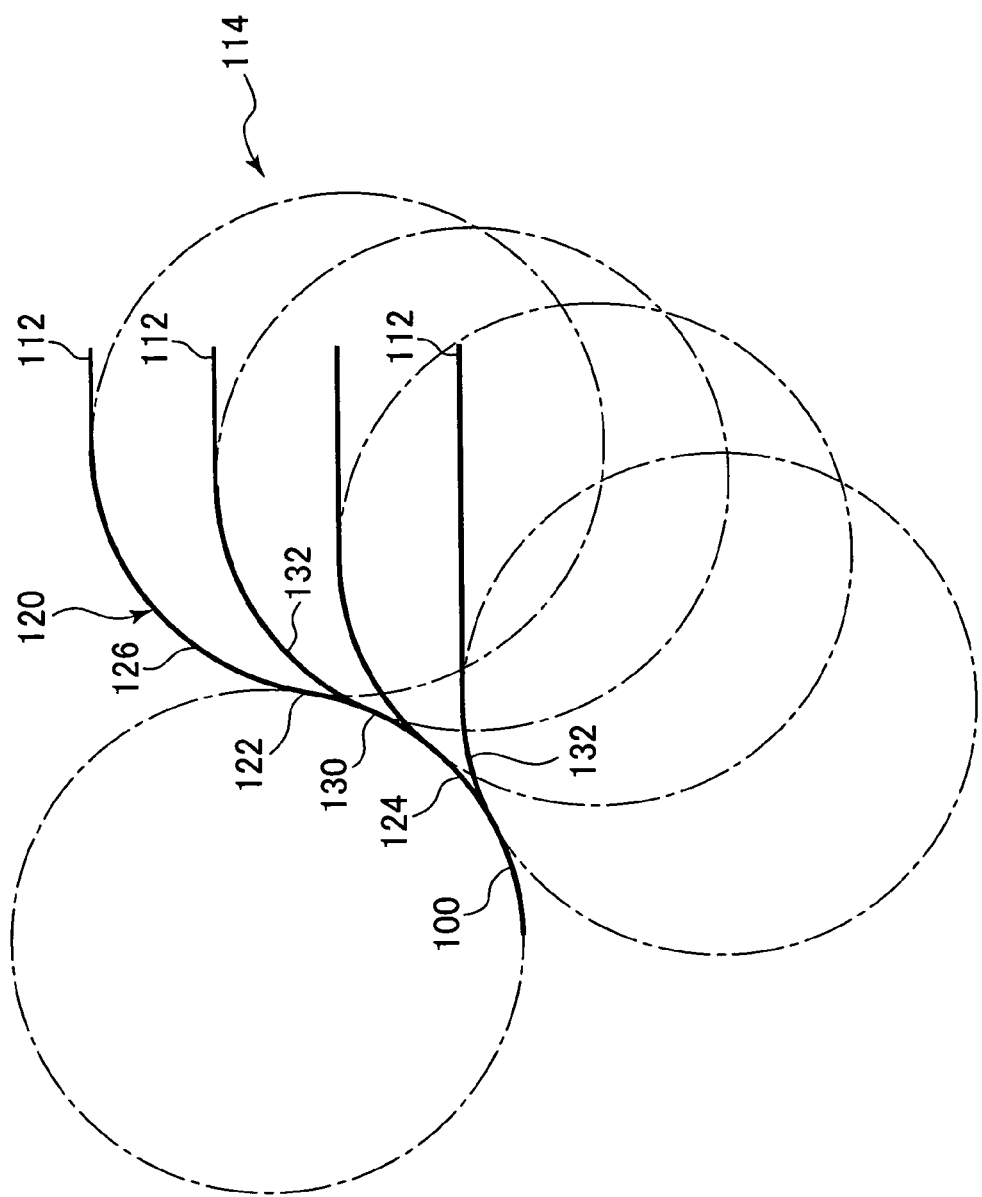
FIG. 4 is a view for explaining an optical waveguide structure of a fourth embodiment of the present invention.

As shown in FIG. 4, an optical waveguide structure of a fourth embodiment of the present invention, is an optical waveguide structure 114 having a single port 100 on one input/output side and a plurality of ports 112 on the other input/output side comprising an S-bent optical waveguide portion 120 arranged on the outermost side of the waveguide structure 114, tangential lines at opposed ends of the S-bent waveguide portion 120 being parallel to each other, the S-bent optical waveguide portion 120 including a first circular arc optical waveguide portion 124 and a second circular arc optical waveguide portion 126 connected thereto at a first inflection point 122 where a curvature of the S-bent optical waveguide portion 120 is inverted; the first circular arc optical waveguide portion 124 having a first splitting/coupling point 130 located on a single-port side relative to the first inflection point 122; and a third circular arc optical waveguide portion 60 extending from the first splitting/coupling point 130 toward the plural-ports side 112 and having a curvature inverted relative to the first circular arc optical waveguide portion 124; wherein, at the first splitting/coupling point 130, a tangential line of the first circular arc optical waveguide portion 124 and a tangential line of the third circular arc optical waveguide portion 132 are parallel to and spaced from each other.

In this embodiment of the waveguide structure, when an input power is equally distributed to the plurality of ports 112, a splitting ratio of the waveguide structure is determined as follows;

$N/2-n:1;$ wherein N indicates a number of splitting points and n indicates an order number from a common port side. In a case of a 1×N type splitter, it has splitting ratios of N/2−1:1, N/2−2:1, N/2−3:1, . . . from the common port side. Concretely, in a case of a 1×4 type splitter, an input power is distributed at a splitting ratio of 1:1; in a case of a 1×16 type splitter, an input power is distributed in a order of splitting ratios of 7:1, 6:1, 5:1, 4:1, 3:1, 2:1 and 1:1; and, in a case of a 1×32 type splitter, an input power is distributed in an order of splitting ratios of 15:1, 14:1, 13:1, 12:1, 11:1, 10:1, 9:1, 8:1, 7:1, 6:1, 5:1, 4:1, 3:1, 2:1 and 1:1.

The optical waveguide structure is preferably used as an optical splitter, but it can be used as a part of another optical device. Such an optical device may include an optical coupler, an optical coupler/splitter, an optical transmitting module, an optical receiving module, an optical transmitting/receiving module, an optical switch, an optical modulation device, an optical filter, an optical deflection device, an optical dispersion compensation device, an optical add-drop module and an optical cross connect device.

The optical waveguide structure can be made in a well-known manner similar to a curved-line optical waveguide structure in the prior art. For example, after a layer of a core material is formed on a cladding, a photosensitive resist layer is formed on the core layer, a mask with a curved-line waveguide configuration of the present invention is placed on the resist layer, the resist layer is exposed and enveloped to form a resist layer with the curved-line waveguide structure, and, for example, the core layer is etched, so that the core with the curved-line waveguide structure is formed. It goes without saying that by using a mask partially having a curved-line waveguide configuration of the present invention in a curved-line waveguide configuration with a constant width in the prior art, an optical waveguide or an optical device partially having the curved-line configuration of the present invention can be made with the curved-line configuration in the prior art.

A material of mask can be an arbitrary known material.

Material for a core and a cladding of the curved-line optical waveguide structure of the present invention may include inorganic material such as glass and semiconductor material and organic material such as resin and, preferably, is resin polymer because it can be processed in a short time by etching and so on. It is arbitrary what the polymer is and the polymer may concretely include polyimide resin (for example, polyimide resin, poly(imide-isoindoloquinazolinedioneimide) resin, polyetherimide resin, polyetherketone resin, and polyestherimide resin), silicone resin, acrylic resin, polystyrene resin, polycarbonate resin, polyamide resin, polyester resin, phenol resin, polyquinoline resin, polyquinoxaline resin, polybenzoxazole resin, polybenzothiazole resin, polybenzoimidazole resin, and a resin for photobleach (for example, polysilane disclosed in Japanese Patent Laid-open Publication No. 2001-296438, silicone resin having nitronic compound, polymethyl methacrylate containing DMAPN {(4-N, N-dimethylaminophenyl)-N-phenylnitrone}, dye polymer, polyimide or epoxy resin containing nitronic compound, hydrolysable silane compound disclosed in Japanese Patent Laid-open Publication No. 2000-66051). The above-stated resin may contain a fluorine atom. As a polymer, polyimide resin is preferable because a glass-transition temperature (Tg) thereof is high and heating resistance thereof is good, and more preferably, polyimide resin containing fluorine in view of a transmission ratio and refractive index.

Polyimide resin with fluorine may include polyimide resin with fluorine, poly(imide-isoindoloquinazolinedioneimide) resin with fluorine, polyetherimide resin with fluorine, and polyamideimide resin with fluorine.

A precursor solution of polyimide resin containing the above-stated fluorine can be obtained by reacting tetracarboxylic dianhydride with diamine in polar solvent such as N-methyl-2-pyrrolidone, N,N-dimethylacetamido, γ-butyrolactone, and dimethyl sulfoxide. Both tetracarboxylic dianhydride and diamine or one thereof may contain Fluorine.

A precursor solution of polyimide resin not containing the above-stated fluorine can be obtained by reacting tetracarboxylic dianhydride without fluorine with diamine without fluorine in polar solvent such as N-methyl-2-pyrrolidone, N,N-dimethylacetamido, γ-butyrolactone, and dimethyl sulfoxide.

Examples of acid dianhydride including fluorine include
(trifluoromethyl)pyromellitic acid dianhydride;
di(trifluoromethyl)pyromellitic acid dianhydride;
di(heptafluoropropyl)pyromellitic acid dianhydride;
pentafluoroethyl pyromellitic acid dianhydride;
bis{3,5-di(trifluoromethyl)phenoxy}piromellitic acid dianhydride;
2,2-bis(3,4-dicarboxyphenyl)hexafluoropropane dianhydride;
5,5'-bis(trifluoromethyl)-3,3',4,4'-tetracarboxybiphenyl dianhydride;
2,2',5,5'-tetrakis(trifluoromethyl)-3,3',4,4'-tetracarboxybiphenyl dianhydride;
5,5'-bis(trifluoromethyl)-3,3',4,4'-tetracarboxy dianhydride;
5,5'-bis(trifluoromethyl)-3,3',4,4'-tetracarboxybenzophenone dianhydride;
bis{(trifluoromethyl)dicarboxyphenoxy}benzen dianhydride;
bis{(trifluoromethyl)dicarboxyphenoxy}(trifluoromethyl)benzen dianhydride;
bis(dicarboxyphenoxy)(trifuloromethyl)benzen dianhydride;
bis(dicarboxy phenoxy)bis(trifluoromethyl)benzen dianhydride;
bis(dicarboxyphenoxy)tetrakis(trifuloromethyl)benzen dianhydride;
2,2'-bis{(4-(3,4-dicarboxyphenoxy)phenyl)hexafluoropropane dianhydride;
bis{(trifuloromethyl)dicarboxyphenoxy}biphenyl dianhydride;
bis{(trifuloromethyl)dicarboxyphenoxy}bis(trifluoromethyl)biphenyl dianhydride;
bis{(trifluoromethyl)dicarboxyphenoxy}diphenylether dianhydride; and
bis(dicarboxyphenoxy)bis(trifluoromethyl)biphenyl dianhydride.

Examples of diamine including fluorine include
4-(1H,1H,11H-eicosafluoroundecanoxy)-1,3-diaminobenzen;
4-(1H,1H-perfluoro-1-butanoxy)-1,3-diaminobenzen;
4-(1Hdiaminobenzen;
4-(1H,1H perfluoro-1-octanoxy)-1,3-diaminobenzen;
4-pentafluorophenoxy-1,3-diaminobenzen;
4-(2,3,5,6-tetrafluorophenoxy)-1,3-diaminobenzen;
4-(4-fluorophenoxy)-1,3-diaminobenzen;
4-(1H,1H,2H,2H-perfluoro-1-hexanoxy)-1,3-diaminobenzen;
4-(1H,1H,2H,2H-perfluoro-1-dodecanoxy)-1,3-diaminobenzen;
2,5-diaminobenzotrifluoride;
bis(trifluoromethyl)phenylenediamine;
diaminotetra(trifluoromethyl)benzene;
diamino(pentafluoroethyl)benzene;
2,5-diamino(perfluorohexyl)benzene;
2,5-diamino(perfluorobutyl)benzen;
2,2'-bis(trifluorometyl)-4,4'-diaminobiphenyl;
3,3'-bis(trifluoromethyl)-4,4'-diaminobiphenyl;
octafluorobenzidine;
4,4'-diaminodiphenylether;
2,2-bis(p-aminophenyl)hexafluoropropane;
1,3-bis(anilino)hexafluoropropane;
1,4-bis(anilino)octafluorobutane;
1,5-bis(anilino)decafluoropentane;
1,7-bis(anilino)tetradecafluoroheptane;
2,2'-bis(trifluoromethyl)-4,4'-diaminodiphenylether;
3,3'-bis(trifluoromethyl)-4,4'-diaminodiphenylether;
3,3',5,5'-tetrakis(trifluoromethyl)-4,4'-diaminodiphenylether;
3,3'-bis(trifluoromethyl)-4,4'-diaminobenzophenone;
4,4'-diamino-p-terphenyl;
1,4-bis(p-aminophenyl)benzene;
p-bis(4-amino-2-trifluoromethylphenoxy)benzene;
bis(aminophenoxy)bis(trifluoromethyl)benzene;
bis(aminophenoxy)tetrakis(trifluoromethyl)benzene;
2,2-bis{4-(4-aminophenoxy)phenyl}hexafluoropropane;
2,2-bis{4-(3-aminophenoxy)phenyl}hexafluoropropane;
2,2-bis{4-(2-aminophenoxy)phenyl}hexafluoropropane;
2,2-bis{4-(4-aminophenoxy)-3,5-dimethylphenyl}hexafluoroprooopane;
2,2-bis{4-(4-aminophenoxy)-3,5-ditrifluorometylphenyl}hexafluoropropane;
4,4'-bis(4-amino-2-trifluoromethylphenoxy)biphenyl;
4,4'-bis(4-amino-3-trifluoromethylphenoxy)biphenyl;
4,4'-bis(4-amino-2-trifluoromethylphenoxy)diphenylsulfone;
4,4'-bis(3-amino-5-trifluoromethylphenoxy)diphenylsulfone;
2,2-bis{4-(4-amino-3-trifluoromethylphenoxy)phenyl}hexafluoropropane;
bis{(trifluoromethyl)aminophenoxy}biphenyl;
bis[{(trifluoromethyl)aminophenoxy}phenyl]hexafluoropropane; and
bis[2-{(aminophenoxy)phenyl}hexafluoroisopropyl]benzene.

Two or more types of the above-mentioned tetracarboxilic dianhydride and diamine can be used together. Regarding a precursor solution of a polyimide resin, a photosensitive one can be used.

The precursor solution of a polyimide resin is applied on a substrate's surface by means of a spinner or a printer and heat-treated and cured at a final temperature of 200-400° C. to make a polyimide resin film.

Now, referring to FIGS. 17 and 18, a splitting/coupling element disclosed in the Patent Publication 3 will be explained and thereafter embodiments of a splitting/coupling point, actually a splitting/coupling element, according to the present invention will be explained.

Figure 17:
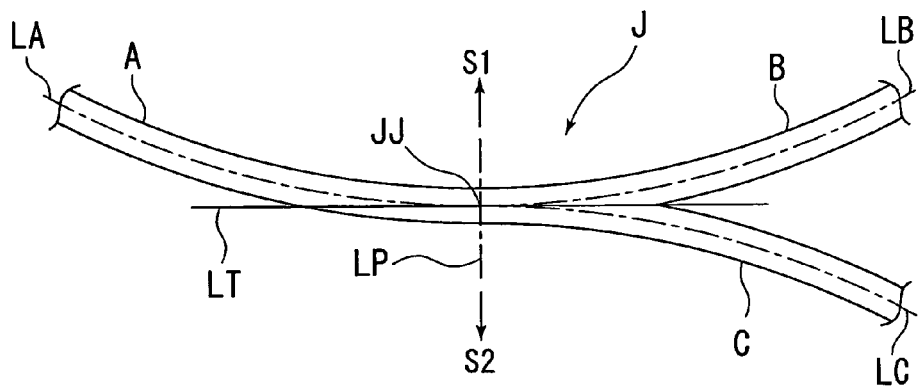
FIG. 17 is a top view of a splitting/coupling element in the prior art.

FIG. 17 shows a splitting/coupling element of an optical waveguide disclosed in the Patent Publication 3. In the Patent Publication 3, only paths of cores of a waveguide are shown as solid lines, but, actually each of the cores of the waveguide has a width, as shown in FIG. 17. The width is constant and thus an axis corresponding to a centerline relative to the width can be determined regarding each core of the waveguide. As shown in FIG. 17, a splitting/coupling element J has a first core A formed on a coupling side along a first axis LA consisting of a line curved toward one side S1, a second core B connected to the first core A and formed on a splitting side along a second axis LB consisting of a line curved toward the one side S1 same as the curved line of the first core A, and a third core C connected to the first core A and formed on the splitting side along a third axis LC consisting of a line curved toward the other side S2, namely, the side opposite to the first core A. In FIG. 17, the first axis LA is common to the second axis LB, the first axis LA (the second axis LB) intersects with the third axis LC at a splitting/coupling point JJ, and tangential lines at the splitting/coupling point JJ of the first axis LA (the second axis LB) and the third axis LC are a common tangential line LT. Further, FIG. 17 shows a perpendicular line LP passing through the splitting/coupling point JJ and extending perpendicular to the tangential line LT.

Figure 18:
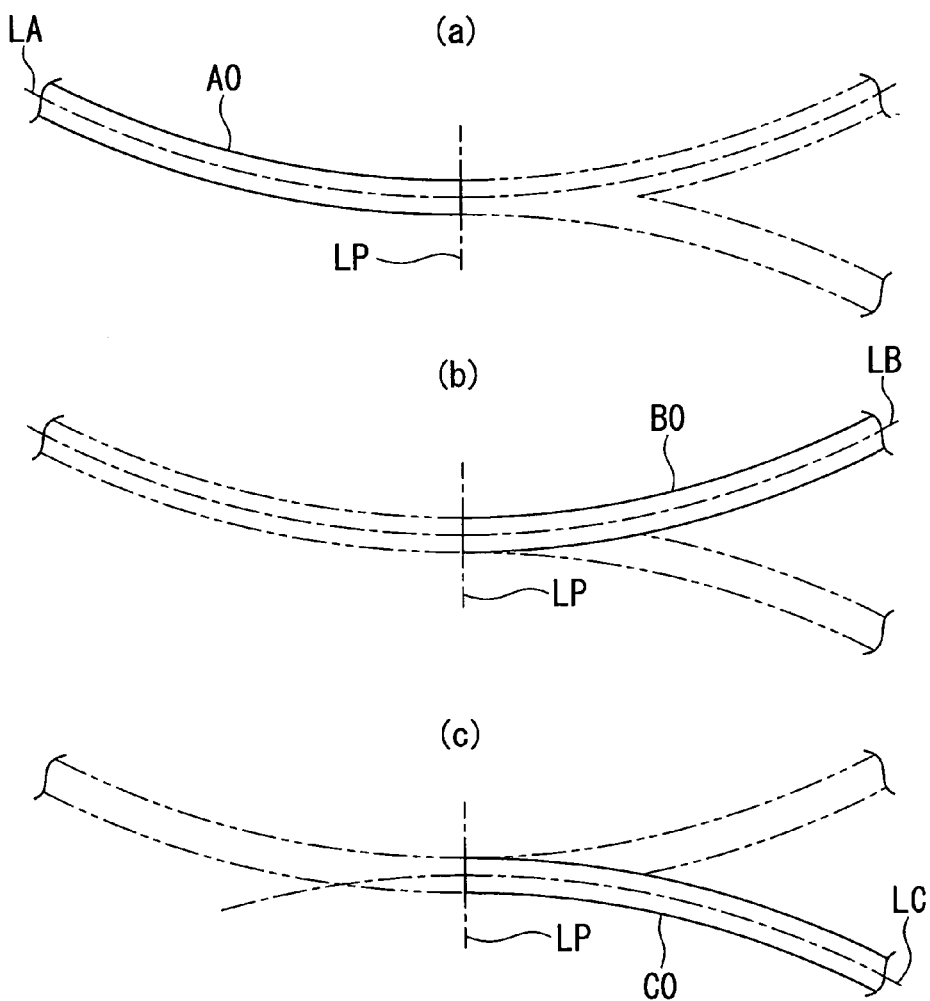
FIG. 18 a view in which only a portion of FIG. 17 is shown by solid lines.

FIGS. 18(*a*)-18(*c*) are figures in which a portion of the splitting/coupling element shown in FIG. 17 is indicated by solid lines. In the following explanations, a portion A0 indicated by solid lines in FIG. 18(a) will be referred to as a first core element, a portion B0 indicated by solid lines in FIG. 18(b) will be referred to as a second core element, and a portion C0 indicated by solid lines in FIG. 18(c) will be referred to as a third core element.

Figure 5:
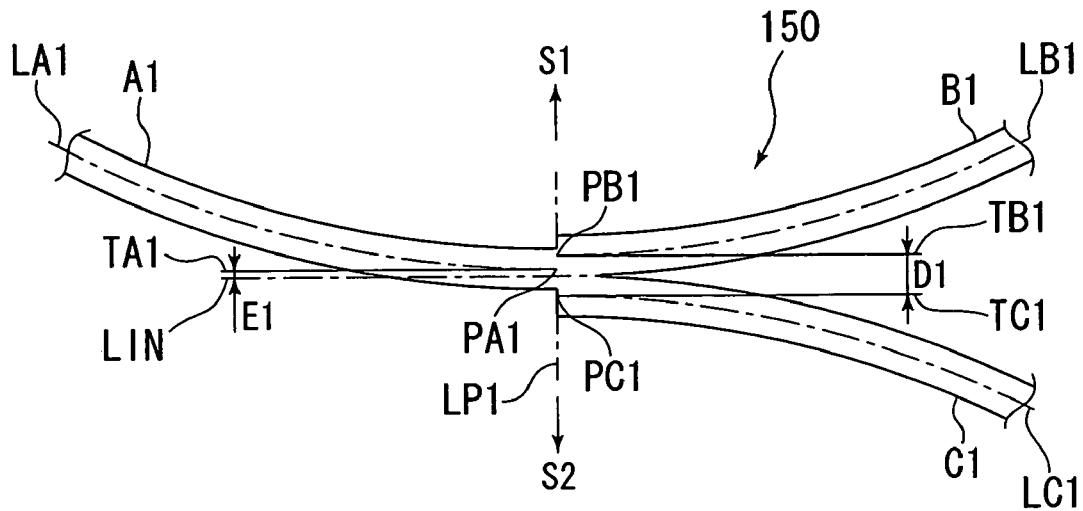
FIG. 5 is a top view of a first embodiment of a splitting/coupling element of the present invention.

FIG. 5 shows a first configuration of a splitting/coupling element in the present invention. The splitting/coupling element 150 has a first core A1 on the coupling side, and a second core B1 and a third core C1 on the splitting side. This configuration can be made by shifting the second core element B0 toward the one side S1 along the perpendicular line LP relative to the first core element A0 shown in FIGS. 18(a)-18(c) and shifting the third core element C0 toward the other side S2 along the perpendicular line LP relative to the first core element A0. The first core A1, the second core B1 and the third core C1 are respectively formed along axes LA1, LB1, LC1. The axes LA1, LB1, LC1 respectively have contact points PA1, PB1, PC1 where the axes LA1, LB1, LC1 contact respective tangential lines TA1, TB1, TC1 parallel to each other. The contact points PA1, PB1, PC1 are located on a perpendicular line LP1 extending through the contact point PA1 and perpendicular to the tangential line TA1 which is a tangential line of the axis LA1 of the first core A1 at the contact point PA1. The contact point PB1 is located on the one side S1 relative to the tangential line TA1 while the contact point PC1 is located on the other side S2 relative thereto. A distance between the tangential lines TB1 and TC1 is indicated by D1 while a distance between the tangential line TA1 and a centerline LIN disposed parallel to the tangential lines TB1, TC1 and in the center thereof is indicated by E1.

In an Example 1, by using a waveguide including the splitting/coupling element 150 shown in FIG. 5, an optical splitter was formed. The three cores A1, B1, C1 of the waveguide were used, each having a width of 6.5 μm and extending along its circular arc axis with a curvature of 15 mm. The offset D1 between a center axis of the second core B1 and that of the third core C1 (a shift in a direction perpendicular to an optical transmitting direction: a distance between the tangential line TB1 and the tangential line TC1) was 6 μm. The offset E1 between the first core and the centerline LIN between the second and third cores, namely, a distance between the tangential line TA1 and the centerline LIN, was 0.3 μm.

When an input wavelength was 1.31 μm, excess loss between the input port A and the output port B was −3.16 dB while excess loss between the input port A and the output port C was −3.15 dB.

When an input wavelength was 1.55 μm, excess loss between the input port A and the output port B was −3.09 dB while excess loss between the input port A and the output port C was −3.19 dB.

Figure 6:
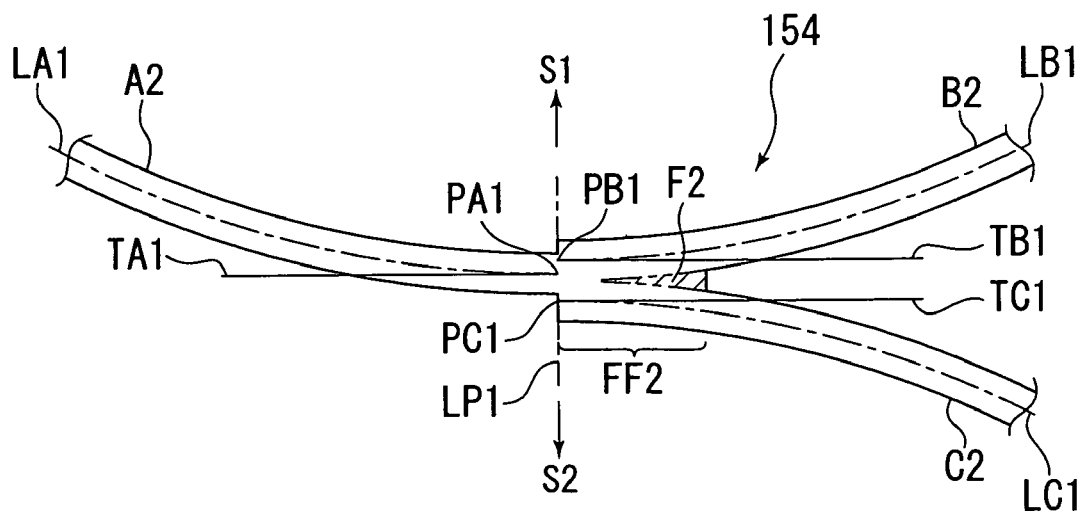
FIG. 6 is a top view of a second embodiment of a splitting/coupling element of the present invention.

As explained above, a splitting structure, in which a splitting ratio thereof was substantially 1:1 regardless of the wavelengths and loss thereof was low, was obtained, FIG. 6 shows a second configuration of the splitting/coupling element in the present invention. The splitting/coupling element 154 has a first core A2 on the coupling side, and a second core B2 and a third core C2 on the splitting side. This configuration can be made by replacing a tip of a cladding portion between the second core B1 and the third core C1 of the splitting/coupling element 150 shown in FIG. 5 with a core portion F2. Therefore, the second core B2 and the third core C2 define together a core portion FF2 extending from the perpendicular line LP1 toward the splitting side.

Providing the core portion F2 can reduce fluctuation of the splitting/coupling element 154 due to manufacturing processes.

Figure 7:
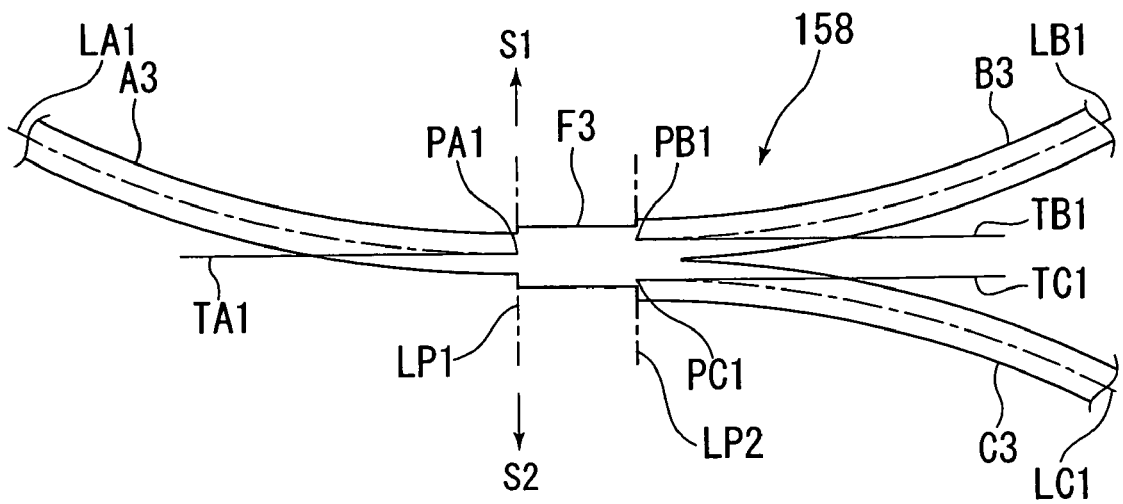
FIG. 7 is a top view of a third embodiment of a splitting/coupling element of the present invention.

FIG. 7 shows a third configuration of the splitting/coupling element in the present invention. The splitting/coupling element 158 has a first core A3 on the coupling side, and a second core B3 and a third core C3 on the splitting side. This configuration can be made by shifting the second core B1 and the third core C1 of the splitting/coupling element 150 shown in FIG. 5 along the tangential line TA1 toward the splitting side, and adding an intermediate core F3 between the first core A1 and the second and third cores B1, C1. Therefore, the contact points PB1, PC1 are located on a perpendicular line LP2 which is parallel to the perpendicular line LP1 and placed on the splitting side relative thereto. Further the intermediate core F3 is disposed between the perpendicular lines LP1, LP2. Preferably, profiles of the intermediate core F3 on the one side S1 and the other side S2 are straight lines parallel to the tangential line TA1. More preferably, the intermediate core F3 defines a multimode optical waveguide. A centerline of the intermediate core F3 conforms to the centerline LIN of the second core B3 and the third core C3.

Figure 8:
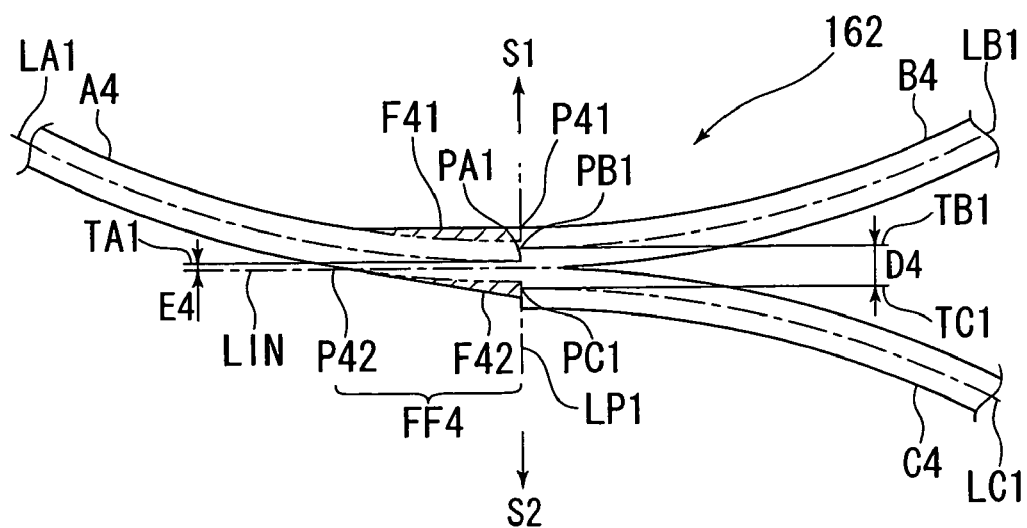
FIG. 8 is a top view of a fourth embodiment of a splitting/coupling element of the present invention.

FIG. 8 shows a fourth configuration of the splitting/coupling element in the present invention. The splitting/coupling element 162 has a first core A4 on the coupling side, and a second core B4 and a third core C4 on the splitting side. This configuration can be made by adding a core portion F41 to the first core A1 of the splitting/coupling element 150 shown in FIG. 5 on the one side S1 and a core portion F42 on the other side S2, respectively. Therefore, the first core A4 includes a tapered portion FF4 in which a width thereof expands toward the perpendicular line LP1. A profile on the one side S1 of the tapered portion FF4 is determined by extending a profile of the second core B4 on the one side S1 from an end P41 thereof along a tangential line at the end P41. In the present embodiment, the profile on the one side S1 is a line parallel to the tangential line TA1. A profile of the tapered portion FF4 on the other side S2 is determined by extending a profile of the first core A4 on the other side S2 from an appropriate point P42 along a tangential line or a straight line at the point P42. A distance between the tangential lines TB1 and TC1 is indicated by D4 while a distance between the tangential line TA1 and a centerline LIN disposed parallel to the tangential lines TB1, TC1 and in the center thereof is indicated by E4.

In an Example 2, by using a waveguide including the splitting/coupling element 162 shown in FIG. 8, an optical splitter was formed. The three cores A4, B4, C4 of the waveguide were used, each having a width of 6.5 μm and extending along its circular arc axis with a curvature of 15 mm. The offset D4 between a centerline of the second core B4 and that of the third core C4 (a shift in a direction perpendicular to an optical transmitting direction: a distance between the tangential line TB1 and the tangential line TC1) was 6 μm. The offset E4 between the first core A4 and the centerline LIN between the second and third cores B4, C4, namely, a distance between the tangential line TA1 and the centerline LIN, was 0.3 μm.

When an input wavelength was 1.31 μm, excess loss between the input port A and the output port B was −3.07 dB while excess loss between the input port A and the output port C was −3.03 dB.

When an input wavelength was 1.55 μm, excess loss between the input port A and the output port B was −3.03 dB while excess loss between the input port A and the output port C was −3.05 dB.

As explained above, a splitting structure, in which a splitting ratio thereof was substantially 1:1 regardless of the wavelengths and loss thereof was low, was obtained.

Figure 9:
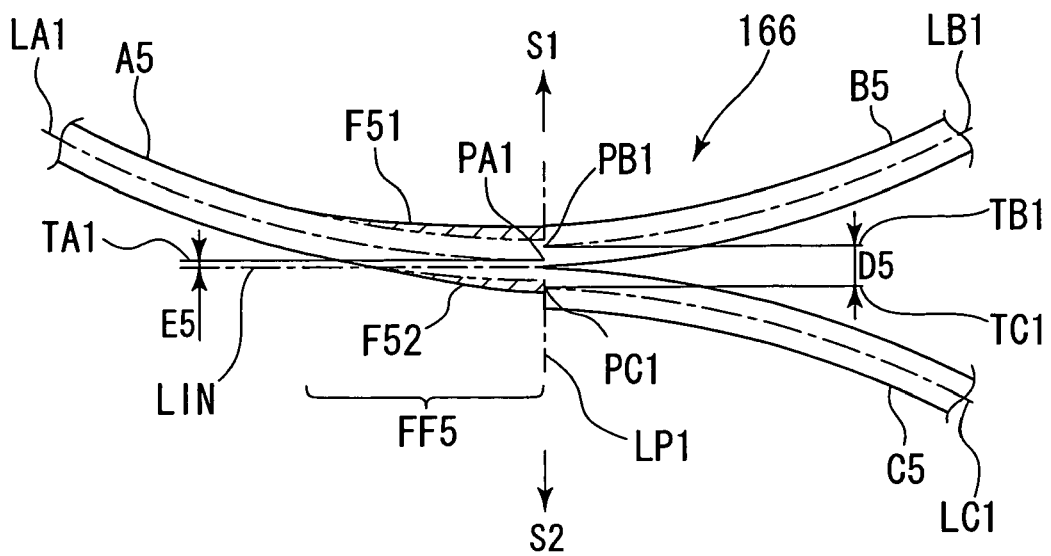
FIG. 9 is a top view of a fifth embodiment of a splitting/coupling element of the present invention.

FIG. 9 shows a fifth configuration of the splitting/coupling element in the present invention. The splitting/coupling element 166 has a first core A5 on the coupling side, and a second core B5 and a third core C5 on the splitting side. This configuration, similar to the splitting/coupling element 162 shown in FIG. 8, can be made by adding core portion F51 to the first core A1 of splitting/coupling element 150 shown in FIG. 5 on the one side S1 and core portion F52 on the other side S2, respectively. Therefore, the first core A5 includes a tapered portion FF5 in which a width thereof expands toward the perpendicular line LP1. This configuration is the same as that of the splitting/coupling element 162 shown in FIG. 8 except for profiles on the one side S1 and on the other side S2 of the tapered portion FF5 which profiles are respectively determined by functions shown in Equations 1 and 2 below. Namely, a width of the tapered portion FF5 increases toward the perpendicular line LP1 according to a trigonometric function. A distance between the tangential lines TB1 and TC1 is indicated by D5 while a distance between the tangential line TA1 and a centerline LIN disposed parallel to the tangential lines TB1, TC1 and in the center thereof is indicated by E5.

Employing the Equations 1 and 2 allows a connection at a starting point of the tapered portion FF5 of the first core A5 to be smooth so that excess loss can be reduced.

In an Example 3, by using a waveguide including the splitting/coupling element shown in FIG. 9, an optical splitter was formed. The three cores A5, B5, C5 of the waveguide were used, each having a width of 6.5 µm and extending along its circular arc axis with a curvature of 15 mm. The offset D5 between a centerline of the second core B4 and that of the third core C4 (a shift in a direction perpendicular to an optical transmitting direction: a distance between the tangential lines TB1 and the tangential line TC1) was 10 µm. The offset E5 between the first core A5 and the centerline LIN between the second and third cores B5, C5, namely, a distance between the tangential line TA1 and the centerline LIN was 4.1 µm. The above-mentioned Equations 1 and 2 are as follows.

$$f_1(z) = \frac{h}{2} + r - \sqrt{r^2 - z^2} + \frac{1}{2}\left[w_s + \frac{w_e - w_s}{l} \cdot z - \frac{w_e - w_s}{2\pi}\sin\frac{2\pi}{lz}\right] \quad \text{Equation 1}$$

$$f_2(z) = \frac{h}{2} + r - \sqrt{r^2 - z^2} - \frac{1}{2}\left[w_s + \frac{w_e - w_s}{l} \cdot z - \frac{w_e - w_s}{2\pi}\sin\frac{2\pi}{lz}\right] \quad \text{Equation 2}$$

It should be noted that $f_1(z)$ corresponds to an upper edge (on the one side S1) while $f_2(z)$ corresponds to a lower edge (on the other side S2). A symbol z indicates a coordinate in a transmitting direction (a direction along the tangential line TA1), a symbol l indicates a length in the transmitting direction, a symbol h indicates a height in a direction orthogonal to the transmitting direction, a symbol r indicates a curvature of a centerline of a tapered waveguide (an axis LA1 of the tapered portion FF5), a symbol $w_s$ indicates a height (a width) of the tapered waveguide at the starting point thereof, and a symbol $w_e$ indicates a height (a width) of the tapered waveguide at an end point thereof.

When an input wavelength was 1.31 µm, excess loss between the input port A and the output port B and excess loss between the input port A and the output port C were evaluated.

When the width of the tapered waveguide at the end point was 15 µm, a splitting ratio between the output waveguides B and C was generally 3:1.

When the width of the tapered waveguide at the end point was 16.5 µm, a splitting ratio between the output waveguides B and C was generally 2:1.

When the width of the tapered waveguide at the end point was 18.5 µm, a splitting ratio between the output waveguides B and C was generally 1:1.

As explained above, by changing a length of the tapered waveguide formed on the input-waveguide side and/or a width thereof at an end point (on the splitting side), a splitting ratio between output waveguides could be adjusted.

Figure 10:
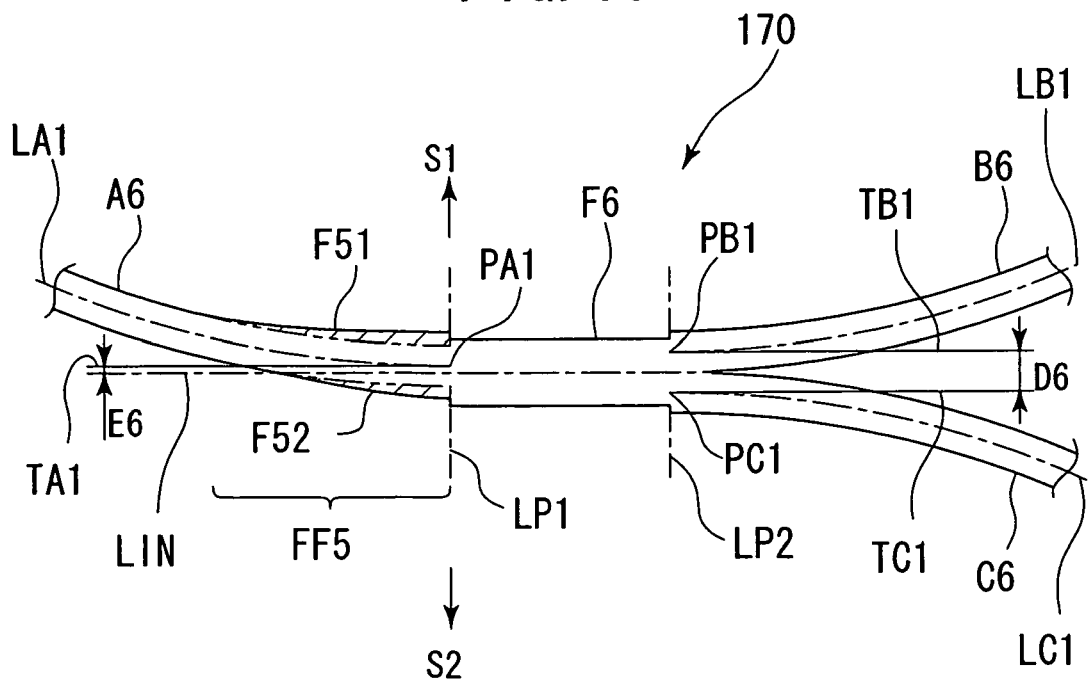
FIG. 10 is a top view of a sixth embodiment of a splitting/coupling element of the present invention.

FIG. 10 shows a sixth configuration of the splitting/coupling element in the present invention. The splitting/coupling element 170 has a first core A6 on the coupling side, and a second core B6 and a third core C6 on the splitting side. This configuration can be made by shifting the second core B5 and the third core C5 of the splitting/coupling element 166 shown in FIG. 9 along the tangential line TA1 toward the splitting side, and adding an intermediate core F6 between the first core A5 and the second and third cores B5, C5. Therefore, the contact points PB1, PC1 are located on a perpendicular line LP2 which is parallel to the perpendicular line LP1 and placed on the splitting side relative thereto. Further the intermediate core F6 is disposed between the perpendicular lines LP1, LP2. Preferably, profiles of the intermediate core F6 on the one side S1 and the other side S2 are straight lines parallel to the tangential line TA1. More preferably, the intermediate core F6 defines a multimode optical waveguide. A centerline of the intermediate core F6 conforms to the centerline LIN of the second core B6 and the third core C6.

In an Example 4, by using a waveguide including the splitting/coupling element 170 shown in FIG. 10, an optical splitter was formed. The three cores A6, B6, C6 of the waveguide were used, each having a width of 6.5 µm and extending along its circular arc axis with a curvature of 15 mm. The offset D6 between a centerline of the second core B6 and that of the third core C6 (a shift in a direction perpendicular to an optical transmitting direction: a distance between the tangential line TB1 and the tangential line TC1) was 10 µm. The offset E6 between the first core A6 and a centerline LIN between the second and third cores B6, C6, namely, a distance between the tangential line TA1 and the centerline LIN, was 3.15 µm. The Equations 1 and 2 are as follows.

$$f_1(z) = \frac{h}{2} + r - \sqrt{r^2 - z^2} + \frac{1}{2}\left[w_s + \frac{w_e - w_s}{l} \cdot z - \frac{w_e - w_s}{2\pi}\sin\frac{2\pi}{lz}\right] \quad \text{Equation 1}$$

$$f_2(z) = \frac{h}{2} + r - \sqrt{r^2 - z^2} - \frac{1}{2}\left[w_s + \frac{w_e - w_s}{l} \cdot z - \frac{w_e - w_s}{2\pi}\sin\frac{2\pi}{lz}\right] \quad \text{Equation 2}$$

It should be noted that $f_1(z)$ corresponds to an upper edge (on the one side S1) while $f_2(z)$ corresponds to a lower edge (on the other side S2). A symbol z indicates a coordinate in a transmitting direction (a direction along the tangential line TA1), a symbol l indicates a length in the transmitting direction, a symbol h indicates a height in a direction orthogonal to the transmitting direction, a symbol r indicates a curvature of a centerline of a tapered waveguide (an axis LA1 of the tapered portion FF5), a symbol $w_s$ indicates a height (a width)

of the tapered waveguide at the starting point thereof, and a symbol $W_e$ indicates a height (a width) of the waveguide at an end point thereof.

When an input wavelength is 1.31 μm, excess loss between the input port A and the output port B and excess loss between the input port A and the output port C were evaluated.

In conditions of L=740 μm and W=18.5 μm, excess loss between the input port A and the output port B was −3.71 dB while excess loss between the input port A and the output port C was −3.63 dB. In these conditions, a splitting ratio between the output waveguides B and C was generally 1:1.

In conditions of L=750 μm and W=15.5 μm, excess loss between the input port A and the output port B was −2.09 dB while excess loss between the input port A and the output port C was −5.18 dB. In these conditions, a splitting ratio between the output waveguides B and C was generally 2:1.

As explained above, by changing a length and/or a width of the waveguide inserted between an input waveguide and output waveguides, a splitting ratio between output waveguides could be adjusted.

Figure 11:
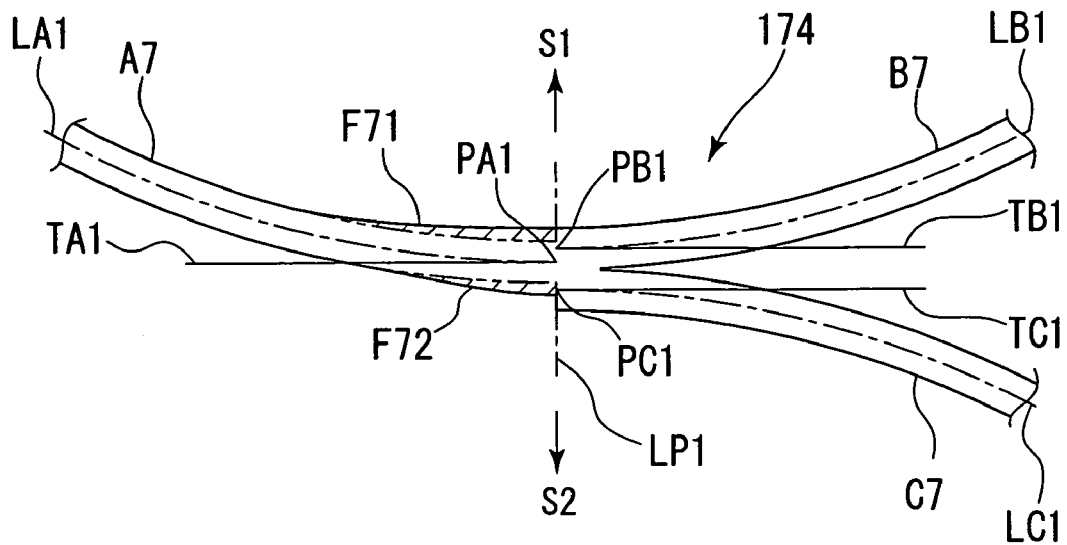
FIG. 11 is a top view of a seventh embodiment of a splitting/coupling element of the present invention.

FIG. 11 shows a seventh configuration of the splitting/coupling element in the present invention. The splitting/coupling element 174 has a first core A7 on the coupling side, and a second core B7 and a third core C7 on the splitting side. This configuration, similar to the splitting/coupling element 162 shown in FIG. 8, can be made by adding core portion F71 to the first core A1 of splitting/coupling element 150 shown in FIG. 5 on the one side S1 and core portion F72 on the other side S2, respectively. Therefore, the first core A7 includes a tapered portion FF7 in which a width thereof expands toward the perpendicular line LP1. This configuration is the same as that of the splitting/coupling element 162 shown in FIG. 8 except for profiles on the one side S1 and on the other side S2 of the tapered portion FF7 which profiles are determined by respective circular arcs.

Figure 12:
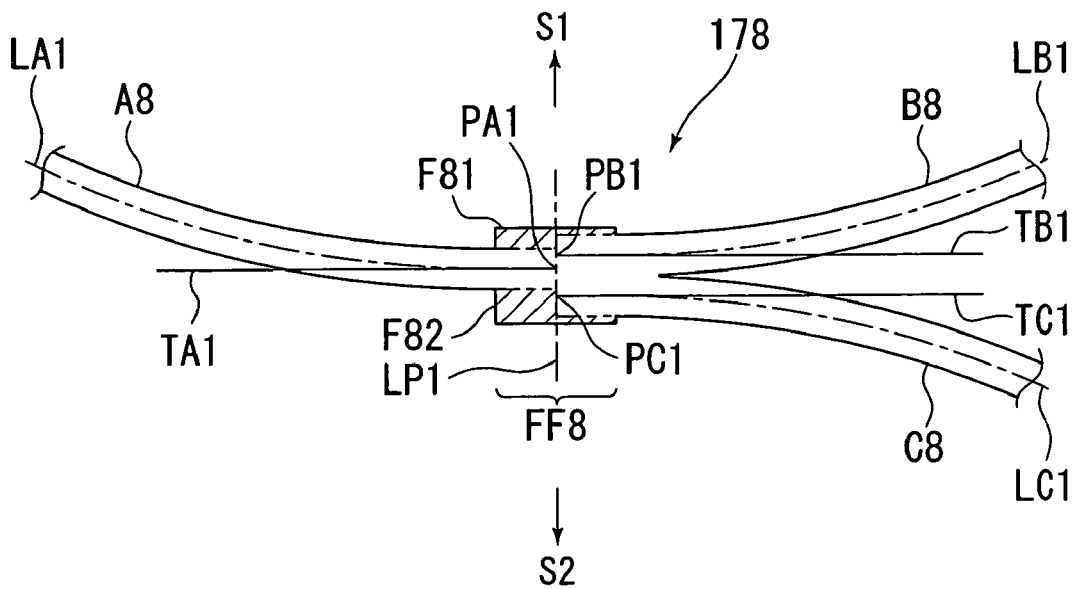
FIG. 12 is a top view of an eighth embodiment of a splitting/coupling element of the present invention.

FIG. 12 shows an eighth configuration of the splitting/coupling element in the present invention. The splitting/coupling element 178 has a first core A8 on the coupling side, and a second core B8 and a third core C8 on the splitting side. This configuration can be made by adding core portions F81 across the perpendicular line LP1 to the one side S1 of the first and second cores A1, B1 of the splitting/coupling element 150 shown in FIG. 5 and by adding core portions F82 across the perpendicular line LP1 to the other side S2 thereof. Therefore, the first, second and third cores A8, B8, C8 define an extended core portion FF8. Preferably, profiles on the one side S1 and on the other side S2 of the extended core portion FF6 are determined by respective straight lines parallel to the tangential line TA1. More preferably, the extended core portion FF8 defines a multimode optical waveguide.

Figure 13:
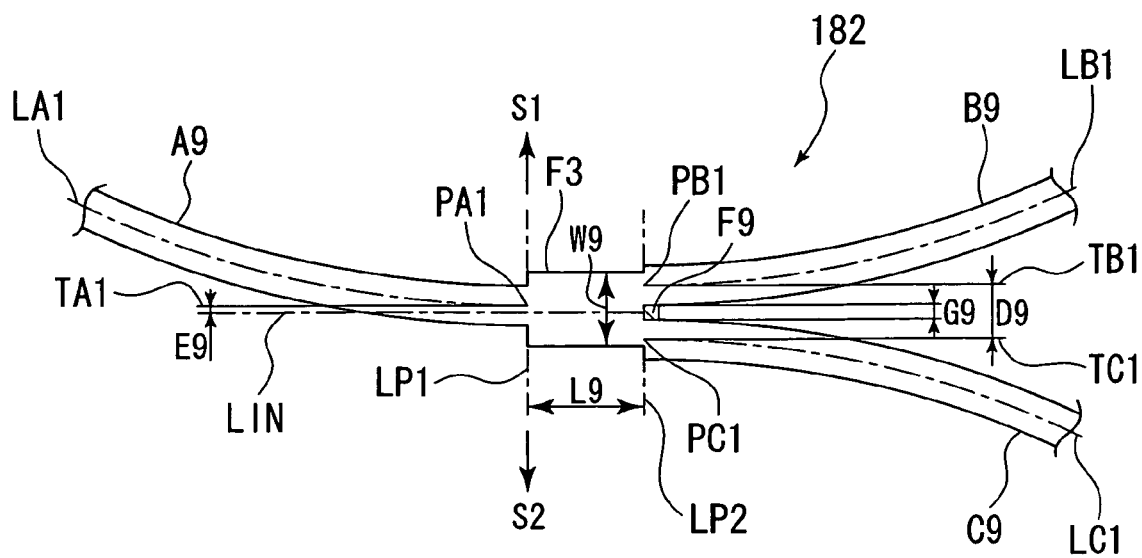
FIG. 13 is a top view of a ninth embodiment of a splitting/coupling element of the present invention.

FIG. 13 shows a ninth configuration of the splitting/coupling element in the present invention. The splitting/coupling element 182 has a first core A9 on the coupling side, and a second core B9 and a third core C9 on the splitting side. This configuration can be made by shifting the second and third cores B3, C3 along the perpendicular line LP2 so as to increase a distance between the second core B3 and the third core C3 of splitting/coupling element 158 shown in FIG. 7 and adding a core portion F9 between the second core B9 and the third core C9. A distance between the tangential line TB1 and the tangential line TC1 is indicated by D9 while a distance between the tangential line TA1 and a centerline LIN disposed parallel to the tangential lines TB1, TC1 and in the center thereof is indicated by E9. Preferably, the intermediate portion F3 defines a multimode optical waveguide. A length of the intermediate core F3 along the tangential line TA1 is indicated by L9 while a width thereof in a direction perpendicular to the tangential line TA1 is indicated by W9. Preferably, the length L9 is 190-220 μm, the width W9 is 13-16 μm, and the distance E9 is 0.3-0.7 μm. Preferably, a distance G9 between the second core B9 and the third core C9 is equal to or more than 3.5 μm.

In an Example 5, by using a waveguide including the splitting/coupling element 182 shown in FIG. 13, an optical splitter was formed. The three cores A9, B9, C9 of the waveguide were used, each having a width of 6.5 μm and extending along its circular arc axis with a curvature of 15 mm. The offset D9 between a centerline of the second core B9 and that of the third core C9 (a shift in a direction perpendicular to an optical transmitting direction: a distance between the tangential lines TB1 and the tangential line TC1) was 10 μm. The offset E9 between the first core A9 and a centerline LIN between the second and third cores B9, C9 was 0.5 μm.

In conditions of L9=200 μm and W9=14 μm, excess loss between the input port A9 and the output port B9 was −3.22 dB (when an input wavelength was 1.31 μm) and −3.29 dB (when an input wavelength was 1.55 μm) while excess loss between the input port A9 and the output port C9 was −3.18 dB (when an input wavelength was 1.31 μm) and −3.25 dB (when an input wavelength was 1.55 μm).

Further, in conditions of L9=220 μm and W9=15 μm, excess loss between the input port A9 and the output port B9 was −3.29 dB (when an input wavelength was 1.31 μm) and −3.25 dB (when an input wavelength was 1.55 μm) while excess loss between the input port A9 and the output port C9 was −3.25 dB (when an input wavelength was 1.31 μm) and −3.21 dB (when an input wavelength was 1.55 μm).

As explained above, a splitting structure, in which a splitting ratio thereof was substantially 1:1 regardless of the wavelengths and loss thereof was low, was obtained.

Figure 14:
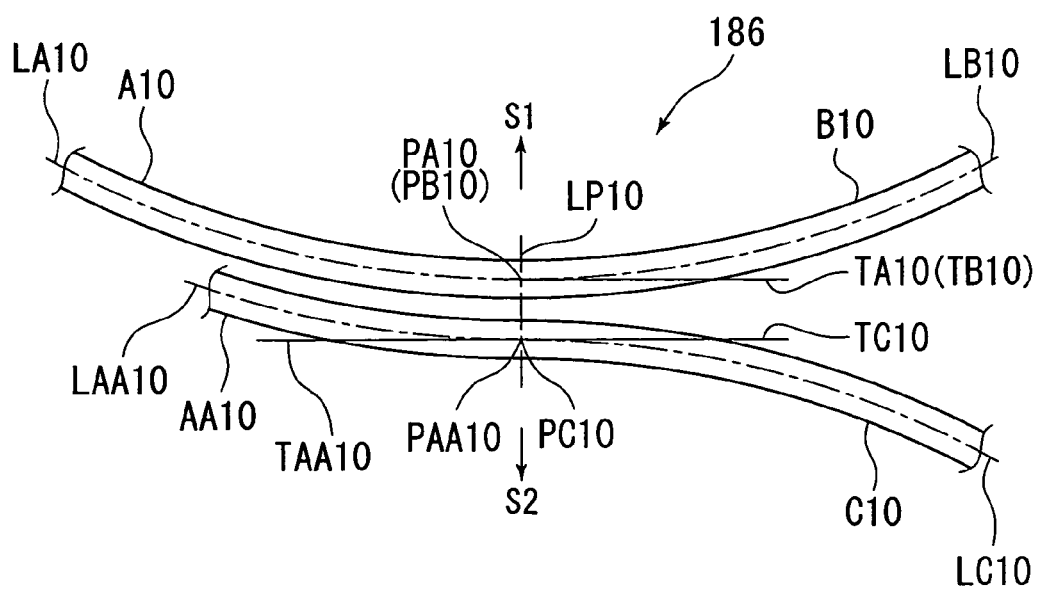
FIG. 14 is a top view of a tenth embodiment of a splitting/coupling element of the present invention.

FIG. 14 shows a tenth configuration of the splitting/coupling element in the present invention. The splitting/coupling element 186 has a first core A10 on the coupling side, a second core B10 and a third core C10 on the splitting side, and a coupler core AA10 defining an optical coupler with the first core A10. This configuration can be made by disposing the coupler core AA10 on the other side S2 of the first core element A0 shown in FIGS. 18(a)-18(c) so that the coupler core AA10 is spaced from and along the first core A0, and shifting the third core element C0 along the perpendicular line LP toward the other side S2 so as to connect it to the coupler core AA10. The first, second and third cores A10, B10, C10 and the coupler core AA10 are formed along respective axes LA10, LB10, LC10, LAA10. The axes LA10, LB10, LC10, LAA10 respectively have contact points PA10, PBL0, PC10, PAA10 where the axes LA10, LB10, LC10, LAA10 respectively contact tangential lines TA10, TB10, TC10, TAA10 parallel to each other. The contact points PA10, PB10, PC10, PAA10 are disposed on a perpendicular line LP10 extending through the contact point PA10 perpendicular to the tangential line TA10 of the axis LA10 of the first core A10 at the contact point PA10. The tangential line TA10 is the same as the tangential line TB10 while the contact point PA1 is the same as the contact point PB1. The contact point PA3 is placed on the other side S2 relative to the tangential line TAA10.

Figure 15:
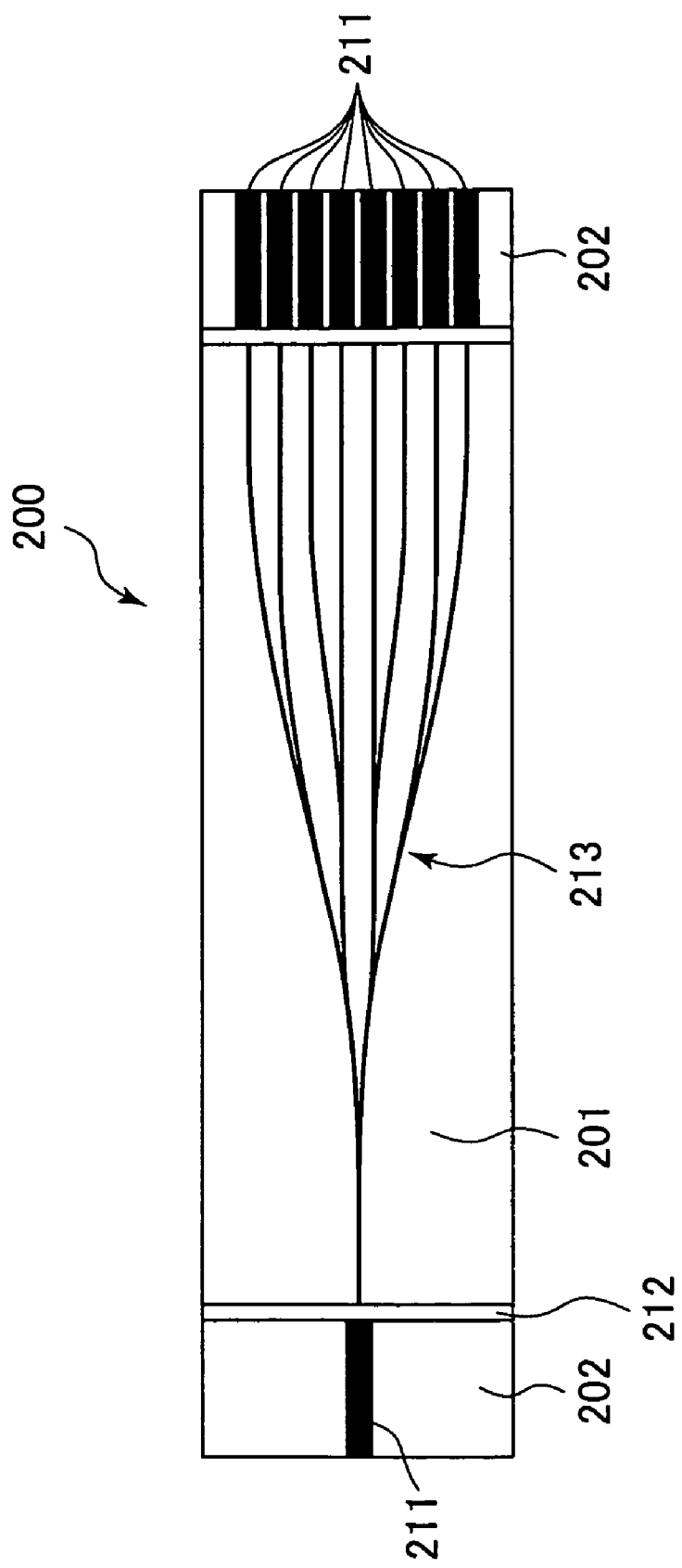
FIG. 15 is a view for explaining an optical waveguide structure of the present invention.

As shown in FIG. 15, using an optical waveguide structure according to the present invention, an optical waveguide substrate for an 1×8 type optical splitter was manufactured as follows.

First, using a CAD for an optical waveguide, an optical waveguide core pattern 213 of an optical waveguide 201 was designed. A straight multimode optical waveguide shown in FIG. 13 was incorporated into splitting/coupling elements of the waveguide 201. Excess loss of the waveguide calculated by using a beam propagation method (BPM) was −9.666 dB (when an input wavelength was 1.31 μm) and −9.72 dB (when an input wavelength was 1.55 μm).

Then, a mask for the above-mentioned core pattern was formed as follows. Since dimensions of a resulting core pattern varied depending on a process of forming it, a core pattern was determined with CAD in view of such variations. In addition to the core pattern, an alignment mark for enhancing positioning accuracy between the mask and a substrate and other marks for measuring the resulting core pattern were designed to incorporate them into the mask. In a procedure of determining the core pattern with CAD, in order to promote efficiency of the design work, first, a core pattern of a single device was designed and then this core pattern was copied and arranged over the whole mask.

The pattern of the single device may be designed by using a layer into which the whole core pattern is incorporated or by using another layer. Based on the core pattern determined with CAD in the above-mentioned manner, the pattern was directly transferred to a substrate with a photolithography machine to make a mask in which portions thereof corresponding to the core pattern were covered with a metal film of Cr and another mask in which portions thereof except for those corresponding to the core pattern were covered with a metal film of Cr.

Which one of the above-mentioned two masks is selected depends on the resist types used in a process of forming the core pattern and processes of forming the core pattern during manufacturing of an optical waveguide.

As explained above, a 1×8 type splitter made by employing an curved optical waveguide according to the present invention obtains better excess loss than a splitter in the prior art made by employing a S-shape curved optical waveguide in which circular-arc type cores are coupled to each other.

Next, an optical waveguide substrate was manufactured by using the following materials.

Core: OPI-N3205 manufactured by Hitachi Chemical Co., Ltd.

Cladding: OPI-N1005 manufactured by Hitachi Chemical Co., Ltd.

In the process for manufacturing the substrate, an organic zirconium chelate was applied on a silicon wafer formed with V-shaped grooves by means of a spin-coating method so that a thickness thereof was 100 angstroms after it was dried. After the chelate was dried, polyimide resin not containing fluorine was applied on the same silicon wafer so that a thickness of the resin was 0.3 μm after it was dried. After the resin was dried, a lower cladding layer (8 μm thickness) and a core layer (6.5 μm thickness), each consisting of polyimide resin containing fluorine, were formed on the silicon wafer.

Then, a resist containing silicon was applied on the core layer, so that a thickness of the resist was 0.5 μm. After the resist was dried, the wafer was exposed via the core pattern mask developed to make a resist pattern, and then the wafer was reactive-ion-etched via the resist pattern to make a patterned core layer. After removing the resist, an upper cladding layer (15 μm thickness) was laminated to form a polyimide optical waveguide. Then, the wafer was cut into substrate chips by dicing.

Insertion loss of the resulting optical waveguide was evaluated. In evaluating it, optical fibers are fixed along respective V-shaped guide grooves formed at the opposed ends of the optical waveguide substrate. A semiconductor laser having a wavelength of 1.31 μm was used as a light source. When the curved optical waveguide according to the present invention was used, an average value of insertion loss was −10.6 dB (−10.8 dB at a port having greatest insertion loss) while, when the S-bent circular-arc curved optical waveguide was used, an average value of insertion loss was −11.2 dB (−11.7 dB at a port having greatest insertion loss).

As explained above, the 1×8 tree type splitter defined by using curved optical waveguides according to the present invention has obtained insertion loss less than that of a splitter in the prior art defined by using S-type circular-arc curved optical waveguides.

Although, in the present example, all S-type curved waveguides of the waveguide structure for the splitter were made of the curved waveguides according to the present invention, other S-type curved waveguide can also exist.

Then, optical fibers were mounted onto the V-shaped cross-sectional guide grooves for optical fibers of the optical waveguide substrate and fixed thereto with adhesive. Insertion loss of the waveguide structure measured by using these fibers was −11.48 dB when a light wavelength was 1.31 μm and −11.26 dB when it was 1.55 μm.

The waveguide substrate had a whole length of 12.4 mm and a width of 2.2 mm. A length of the waveguide portion of the substrate except for fiber connecting portions thereof was 9.4 mm.

COMPARATIVE EXAMPLE

Figure 16:
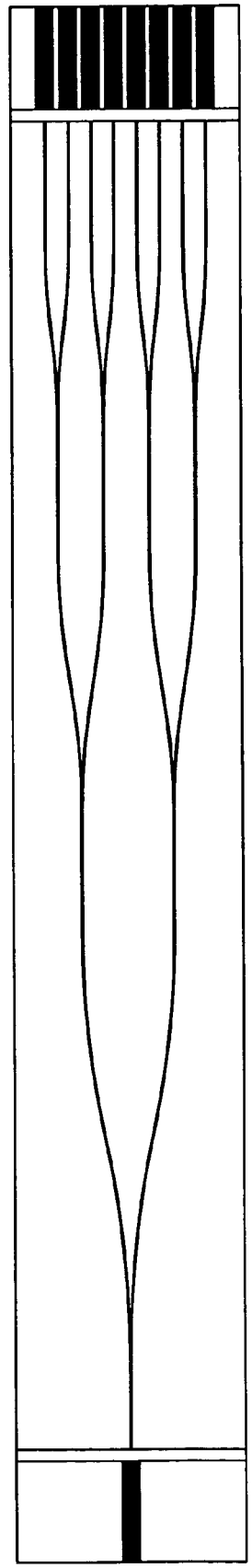
FIG. 16 is a view for explaining an optical waveguide structure of the present invention.

For comparison, an optical waveguide substrate for 1×8 type optical splitter as shown in FIG. 16 was made as follows. First, by using a CAD for an optical waveguide, a waveguide core pattern 213 for a waveguide portion 201 was determined.

A tapered core structure was incorporated into a splitting/coupling element and in order to connect splitting/coupling elements, a curved line waveguide therebetween was employed. Excess loss of the splitter calculated by using a beam propagation method (BPM) was −9.68 dB when a light wavelength was 1.31 μm and −9.83 dB when it was 1.55 μm.

A mask therefore was made and then a waveguide substrate was made in a way similar to that for making the above-mentioned mask and substrate except that a waveguide pattern was changed and a pitch of fiber guide grooves was changed in accordance with a length of the waveguide was increased. Further, optical fibers are mounted in a way similar to that above-mentioned. Insertion loss of the splitter measured by using these fibers was −11.90 dB when a light wavelength was 1.31 μm and −11.35 dB when it was 1.55 μm. The waveguide substrate had a whole length of 18.0 mm and a width of 2.2 mm. A length of a waveguide portion of the splitter except for fiber connecting portions was 15.04 mm.

In an optical waveguide for an optical splitter according to the present invention, a length thereof can be much shorter without increasing loss thereof. Therefore, in a method of manufacturing waveguide substrates from a wafer similar to that for manufacturing semiconductor substrates, the number of substrate chips manufacturable from a wafer increases so that manufacturing cost of each waveguide substrate can be reduced Especially, in a polymer optical waveguide, loss can be reduced. Loss per length of a polymer waveguide is larger than that of a quartz waveguide because loss derived from a material is proportional to a transmitting length of the waveguide, and thus, in a polymer optical waveguide, shortening the length thereof causes total loss thereof to be greatly reduced. When loss per length is greater than 0.1 dB/cm, loss is greatly reduced. Further, since the longer the total length is, the greater the reduction in loss is, in a 1×N type multi splitter, when it has a large scale pattern in which the number of splitting points N is large, loss is greatly reduced. Concretely, loss is effectively reduced when a length of the waveguide is equal to or more than 5 mm.

Waveguide patterns can easily be made according to the above-mentioned clear principles so that the time needed for determining such patterns can be reduced.

In the above-stated embodiments of the splitting/coupling element, although the contact points PB1-PB9 of the second core portion B1-B9 were offset from the tangential line TA1 of the axis LA1 of the first core portion A1-A9, the contact points PB1-PB9 may be located on the tangential line TA1 if an allowable splitting ratio can be given.

The exemplary splitting/coupling elements having a taper portion were shown in FIGS. 8-11 and 13, but profiles of such taper portions are not limited if an allowable loss can be obtained. For example, a starting point of the taper portion can be shifted and the taper portion may be defined by straight lines or curved lines not shown.

Further, distances of shifting the first, second and third core elements A0, B0, C0 along the perpendicular lines LP1, LP2 to arrange an splitting/coupling element according to the present invention are arbitrarily determined, taking loss and a splitting ratio into consideration. Therefore, profiles of the first, second, and intermediate core portions in the above-mentioned embodiments can be connected to each other in a smooth way, in a stepped way or in an inclined way.

Further, although the splitting/coupling elements not including a point-shaped cladding portion were shown in the embodiments shown in FIGS. 6 and 13, such point-shaped cladding portions in the other embodiments can be replaced with a core portion to reduce fluctuation of the splitting/coupling elements derived from manufacture thereof.

What is claimed is:

1. An optical waveguide structure having a single port on one input/output side and a plurality of ports on another input/output side comprising:
    an S-bent optical waveguide portion arranged on the outermost side of the waveguide structure; tangential lines at opposed ends of the S-bent waveguide portion being parallel to each other; the S-bent optical waveguide portion including a first circular arc optical waveguide portion and a second circular arc optical waveguide portion connected thereto at a first inflection point where a curvature of the S-bent optical waveguide portion is inverted; the first circular arc optical waveguide portion having a first splitting/coupling point located on a single-port side relative to the first inflection point; and
    a third circular arc optical waveguide portion extending from the first splitting/coupling point toward the plural-ports side and having a curvature inverted relative to the first circular arc optical waveguide portion;
    wherein, at the first splitting/coupling point, a tangential line of the first circular arc optical waveguide portion and a tangential line of the third circular arc optical waveguide portion are parallel to and spaced from each other, and
    wherein the curvatures of the first, second and third circular arc optical waveguide portions are identical to the other.

2. An optical waveguide structure having a single port on one input/output side and a plurality of ports on another input/output side comprising:
    an S-bent optical waveguide portion arranged on the outermost side of the waveguide structure; tangential lines at opposed ends of the S-bent waveguide portion being parallel to each other: the S-bent optical waveguide portion including a first circular arc optical waveguide portion and a second circular arc optical waveguide portion connected thereto at a first inflection point where a curvature of the S-bent optical waveguide portion is inverted: the first circular arc optical waveguide portion having a first splitting/coupling point located on a single-port side relative to the first inflection point; and
    a third circular arc optical waveguide portion extending from the first splitting/coupling point toward the plural-ports side and having a curvature inverted relative to the first circular arc optical waveguide portion;
    wherein, at the first splitting/coupling point, a tangential line of the first circular arc optical waveguide portion and a tangential line of the third circular arc optical waveguide portion are parallel to and spaced from each other,
    wherein the third circular arc optical waveguide portion has a second splitting/coupling point;
    said optical waveguide structure further comprising a fourth circular arc optical waveguide portion extending from the second splitting/coupling point toward the plural-ports side and having a curvature inverted relative to the third circular arc optical waveguide portion;
    wherein, at the second splitting/coupling point, a tangential line of the third circular arc optical waveguide portion and a tangential line of the fourth circular arc optical waveguide portion are parallel to and spaced from each other.

3. The optical waveguide structure according to claim 2, wherein the fourth circular arc optical waveguide portion has a third splitting/coupling point;
    said optical waveguide structure further comprising a fifth circular arc optical waveguide portion extending from the third splitting/coupling point toward the plural-ports side and having a curvature inverted relative to the fourth circular arc optical waveguide portion;
    wherein, at the third splitting/coupling point, a tangential line of the fourth circular arc optical waveguide portion and a tangential line of the fifth circular arc optical waveguide portion are parallel to and spaced from each other.

4. The optical waveguide structure according to claim 3, wherein the curvatures of the first, second, third, fourth and fifth circular arc optical portions are identical to each other.

5. The optical waveguide structure according to claim 2, wherein the curvatures of the first, second, third and fourth circular arc optical waveguide portions are identical to each other.

6. An optical waveguide structure having a single port on one input/output side and a plurality of ports on another input/output side comprising:
    an S-bent optical waveguide portion arranged on the outermost side of the waveguide structure; tangential lines at opposed ends of the S-bent waveguide portion being parallel to each other; the S-bent optical waveguide portion including a first circular arc optical waveguide portion and a second circular arc optical waveguide portion connected thereto at a first inflection point where a curvature of the S-bent optical waveguide portion is inverted; the first circular arc optical waveguide portion having a first splitting/coupling element located on a single-port side relative to the first inflection point;
    wherein the first circular arc optical waveguide portion has a first core formed on a coupling side along a first axis consisting of a line curved toward one side and a second core connected to the first core and formed on a splitting side along a second axis consisting of a line curved toward the one side;

said optical waveguide structure further comprising a third core connected to the first core and formed on the splitting side along a third axis consisting of a line curved toward the other side;

wherein the first axis, the second axis and the third axis include respectively a first contact point, a second contact point and a third contact point where the first axis, the second axis and the third axis contact respective tangential lines parallel to each other;

wherein the second contact point and the third contact point are located in a region on the splitting side relative to a reference perpendicular line extending through the first contact point and perpendicular to a reference tangential line which is the tangential line of the first axis at the first contact point;

wherein the third contact point is located on the other side relative to the reference tangential line, wherein the first axis, the second axis and the third axis are circular arcs, and wherein the curvatures of the first, second and third axes are identical to each other.

7. The optical waveguide structure according to claim 6, wherein the second contact point is located on the one side relative to the reference tangential line.

8. The optical waveguide structure according to claim 7, wherein the first contact point, the second contact point and the third contact point are located on the reference perpendicular line.

9. The optical waveguide structure according to claim 8, wherein the first core includes a tapered portion, a width of which expands toward the reference perpendicular line.

10. The optical waveguide structure according to claim 8, wherein the second core and the third core commonly include a core portion extending from the reference perpendicular line toward the splitting side so that the second core and the third core are formed integrally.

11. The optical waveguide structure according to claim 8, wherein the first core, the second core and the third core commonly include an expanded core portion extending across the reference perpendicular line and having profiles on the one side and the other side parallel to the reference tangential line.

12. The optical waveguide structure according to claim 6, wherein the second core and the third core commonly include a core portion extending from the reference perpendicular line toward the splitting side so that the second core and the third core are formed integrally.

13. The optical waveguide structure according to claim 6, wherein the first core includes a tapered portion, a width of which expands toward the reference perpendicular line.

14. The optical waveguide structure according to claim 6, wherein the first core, the second core and the third core commonly include an expanded core portion extending across the reference perpendicular line and having profiles on the one side and the other side parallel to the reference tangential line.

15. The optical waveguide structure according to claim 7, wherein the second contact point and the third contact point are located on a second perpendicular line, which is parallel to the reference perpendicular line and placed on the splitting side relative to the reference perpendicular line, and said optical waveguide structure further comprising an intermediate core between the reference perpendicular line and the second perpendicular line.

16. The optical waveguide structure according to claim 15, wherein profiles of the intermediate core on the one side and the other side are respective straight lines parallel to the reference tangential line.

17. The optical waveguide structure according to claim 16, wherein the intermediate core defines a multimode optical waveguide.

18. The optical waveguide structure according to claim 15, wherein the first core has a tapered portion, a width of which expands toward the reference perpendicular line.

19. An optical waveguide structure having a single port on one input/output side and a plurality of ports on another input/output side comprising:

an S-bent optical waveguide portion arranged on at least one of the outermost sides of the waveguide structure; the S-bent optical waveguide portion including a first circular arc optical waveguide portion and a second circular arc optical waveguide portion connected thereto at a first inflection point where a curvature of the S-bent optical waveguide portion is inverted; the first circular arc optical waveguide portion having a first splitting/coupling element located on a single-port side relative to the first inflection point;

wherein the first circular arc optical waveguide portion has a first core formed on a coupling side along a first axis consisting of a line curved toward one side and a second core connected to the first core and formed on a splitting side along a second axis consisting of a line curved toward the one side;

said optical waveguide structure further comprising a coupler core formed along a coupler axis spaced from the first core on the other side and extending alongside of the first core, and defining an optical coupler with the first core, and a third core connected to the coupler core and formed on the splitting side along a third axis consisting of a line curved toward the other side;

wherein the first axis, the second axis, the third axis and the coupler axis include respectively a first contact point, a second contact point, a third contact point and a coupler contact point where the first axis, the second axis, the third axis and the coupler axis contact respective tangential lines parallel to each other;

wherein the second contact point and the third contact point are located in a region on the splitting side relative to a reference perpendicular line extending through the first contact point and perpendicular to a reference tangential line which is the tangential line of the first axis at the first contact point;

wherein the coupler contact point is located on the reference perpendicular line;

wherein the third contact point is located on the other side relative to a tangential line contacting the coupler axis at the coupler contact point;

wherein the first axis, the second axis and the third axis are arcs, and wherein the curvatures of the first, second and third axes are identical to each other.

20. The optical waveguide structure according to claim 19, wherein the arcs of the first axis, the second axis and the third axis are circular arcs.

* * * * *